US012801964B2

(12) United States Patent
Meinert et al.

(10) Patent No.: US 12,801,964 B2
(45) Date of Patent: Nov. 17, 2026

(54) CELL FOR CARRYING OUT QUANTUM OPTICAL MEASUREMENTS

(71) Applicant: Universität Stuttgart, Stuttgart (DE)

(72) Inventors: Florian Meinert, Herrenberg (DE); Philipp Ilzhöfer, Stuttgart (DE); Christian Hölzl, Stuttgart (DE); Tilman Pfau, Sindelfingen/Darmsheim (DE)

(73) Assignee: Universität Stuttgart, Stuttgart (DE)

( * ) Notice: Subject to any disclaimer, the term of this patent is extended or adjusted under 35 U.S.C. 154(b) by 576 days.

(21) Appl. No.: 18/071,598

(22) Filed: Nov. 29, 2022

(65) Prior Publication Data

US 2023/0169385 A1 Jun. 1, 2023

(30) Foreign Application Priority Data

Nov. 29, 2021 (EP) .................................... 21211024

(51) Int. Cl.
*G21K 1/30* (2026.01)
*G06N 10/40* (2022.01)

(52) U.S. Cl.
CPC ............... *G06N 10/40* (2022.01); *G21K 1/30* (2026.01)

(58) Field of Classification Search
None
See application file for complete search history.

(56) References Cited

U.S. PATENT DOCUMENTS 9,934,469 B1 4/2018 Jau et al.
2021/0410266 A1* 12/2021 Saffman ................. G06N 10/40
2022/0291268 A1* 9/2022 Anderson .......... G01R 29/0892

OTHER PUBLICATIONS

Bernien, Hannes , et al., "Probing many-body dynamics on a 51-atom quantum simulator", Nature, vol. 551, 20 pages, Nov. 30, 2017.

(Continued)

*Primary Examiner* — Eliza W Osenbaugh-Stewart
(74) *Attorney, Agent, or Firm* — Taft Stettinius & Hollister LLP

(57) ABSTRACT

A cell (110) for carrying out quantum optical measurements on at least one atom cloud is proposed. The cell (110) comprises a control unit (114) for controlling electric fields at the location (112) of the atom cloud. The control unit (114) comprises:

at least one housing (116) having at least one interior (120) for receiving the atom cloud and having at least one opening (122) for introducing the atoms of the atom cloud into the interior (120); and at least two electrodes (118), wherein the electrodes (118), independently of one another, are able to be subjected to electrical potentials and are configured to influence at least one electric field in the interior (120), wherein the electrodes (118) are mechanically connected to the housing (116).

At least one of the electrodes (118) is at least partly formed by at least one optical window (130) through which at least one light beam (132) for interaction with the atom cloud is able to be radiated into the interior (120). The optical window (130) comprises at least one transparent substrate (134) and at least one transparent electrically conductive coating (136) of the substrate (134). Furthermore, a system (182) for carrying out quantum optical measurements on at least one atom cloud, a quantum computer (204) and a method for carrying out quantum optical measurements on at least one atom cloud are proposed.

20 Claims, 7 Drawing Sheets

(56) References Cited

OTHER PUBLICATIONS

Browaeys, A. , et al., "Many-body physics with individually controlled Rydberg atoms", Nature Physics 16, 132-142, Feb. 1, 2020.
Eltony, Amira M., et al., "Technologies for trapped-ion quantum information systems", Arxiv.Org, Cornell University Library, 19 pages,, Mar. 23, 2016.
Engel, Felix , et al., "Observation of Rydberg blockade induced by a single ion", Physical Review Letters 121.19, 7 pages, Sep. 5, 2018.
Graham, T. M., et al., "Rydberg-Mediated Entanglement in a Two-Dimensional Neutral Atom Qubit Array", Physical Review Letters 123, 230501, 6 pages, Dec. 4, 2019.
Levine, Harry , et al., "Parallel Implementation of High-Fidelity Multiqubit Gates with Neutral Atoms", Physical Review Letters 123, 6 pages,, Oct. 22, 2019.
Madjarov, Ivaylo S., et al., "High-fidelity entanglement and detection of alka-line-earth Rydberg atoms", Nature Physics vol. 16, 6 pages, Aug. 1, 2020.
Mcclelland, J. J., et al., "Bright focused ion beam sources based on laser-cooled atoms", Applied Sciences Reviews, American Institute of Physics, Applied Physics Review 3, 33 pages,, Mar. 24, 2016.
Meinert, Florian , et al., "Indium tin oxide films meet circular Rydberg atoms: Prospects for novel quantum simula-tion schemes", Physical Review Research 2, 023192, 7 pages, May 19, 2020.
Saffman, M. , "Quantum computing with atomic qubits and Rydberg interactions: progress and challenges", Journal of Physics. B: At. Mol. Opt. Phys. 49, 25 pages,, Oct. 4, 2016.

* cited by examiner

CELL FOR CARRYING OUT QUANTUM OPTICAL MEASUREMENTS

CROSS-REFERENCE TO RELATED APPLICATIONS

This application claims priority to European Patent Application No. 21211024.1 filed on Nov. 29, 2021, the contents of which are incorporated herein by reference in their entireties.

TECHNICAL FIELD

The present invention relates to a cell for carrying out quantum optical measurements on at least one atom cloud, to a system for carrying out quantum optical measurements on at least one atom cloud, to a quantum computer, and also to a method for carrying out quantum optical measurements on at least one atom cloud. Apparatuses and methods of this type are used for example in the field of quantum computers, quantum simulations, in quantum sensor technology or generally in the field of quantum optics. However, other areas of use are also possible.

TECHNICAL BACKGROUND

In the field of quantum computing and quantum simulations, it is customary to prepare atoms, for example laser-cooled atoms and in particular so-called Rydberg atoms, in a targeted manner as individually addressable quantum bits, also called qubits. For this purpose, quantum computers or quantum simulators operate for example with arrangements of optical tweezers, wherein quantum operations are realized by way of excitations into Rydberg states by means of gate lasers. However, such Rydberg states are extremely sensitive to electric fields and can even be manipulated in a targeted manner by application of electric fields.

A. Browaeys and T. Lahaye, “Many-body physics with individually controlled Rydberg atoms”, *Nature Physics* 16, 132, 2020 describe systems of individually controlled neutral atoms which interact with one another when excited to Rydberg states, which have proved to be a promising platform in particular for the simulation of spin systems. The techniques required for the manipulation of neutral atoms for the purpose of quantum simulation are presented—such as quantum gas microscopes and arrangements of optical tweezers—and an explanation is given of how the different types of interactions between Rydberg atoms enable a natural mapping to different quantum spin models. Achievements in the investigation of quantum multiparticle physics on this platform and some current research directions are discussed in addition.

M. Saffman, “Quantum computing with atomic qubits and Rydberg interactions: progress and challenges”, *J. Phys. B: At. Mol. Opt. Phys.* 49, 202001, 2016, gives an overview of quantum computing with neutral atom qubits. An overview of architectural options and approaches for preparing large qubit arrangements is followed by an examination of Rydberg-based gate protocols and the reliability of two- and multi-qubit interactions. Quantum simulation and Rydberg dressing are alternatives to gate-based quantum computing for research into quantum dynamics. The properties of the Rydberg dressing interaction are examined, yielding a quantitative value for the complexity of the coherent dynamics that can be accessed by Rydberg dressing.

H. Bernien, S. Schwartz, A. Keesling, H. Levine, A. Omran, H. Pichler, S. Choi, A. S. Zibrov, M. Endres and M. V. V. Greiner, “Probing many-body dynamics on a 51-atom quantum simulator”, Nature 551, 579, 2017, describe controllable, coherent multiparticle systems which afford insights into the fundamental properties of quantum matter, make it possible to realize new quantum phases and ultimately lead to computing systems that surpass the performance of existing computers based on classical approaches. A method for producing controlled multiparticle quantum matter is demonstrated which combines deterministically prepared, reconfigurable arrangements of individually trapped cold atoms with strong, coherent interactions which are made possible by excitation to Rydberg states. A programmable quantum spin model of the Ising type with tunable interactions and system sizes of up to 51 qubits is realized. Phase transitions to spatially ordered states which break various discrete symmetries are observed within this model. Furthermore, there is verification of the preparation of these states with high quality, and examination of the dynamics via the phase transition in large arrangements of atoms. In particular, robust multiparticle dynamics are observed which correspond to sustained oscillations of the order after rapid quantum quenching which originates from a sudden transition across the phase boundary.

H. Levine, A. Keesling, G. Semeghini, A. Omran, T. T. Wang, S. Ebadi, H. Bernien, M. Greiner, V. Vuletić, H. Pichler and M. D. Lukin, “Parallel Implementation of High-Fidelity Multiqubit Gates with Neutral Atoms”, *Phys. Rev. Lett.* 123, 170503, 2019, describe the implementation of universal two- and three-qubit entanglement gates on neutral atom qubits which are encoded in long-lived hyperfine ground states. The gates are mediated by excitation to strongly interacting Rydberg states and are implementable in parallel on a plurality of atom clusters in a one-dimensional arrangement of optical tweezers. The CZ gate is realized, in particular, which is realized by means of a novel, fast protocol which requires only a global coupling of two qubits to Rydberg states. This procedure is tested by the preparation of Bell states with a quality of F≥95.0(2)% and a gate accuracy of ≥97.4(3)%, averaged over five pairs of atoms. In addition, a proof-of-principle implementation of the three-qubit Toffoli gate is reported in which two control atoms simultaneously restrict the behavior of a target atom. These experiments show that the key components are present for extremely reliable quantum information processing in a scalable platform with neutral atoms.

T. M. Graham, M. Kwon, B. Grinkemeyer, Z. Marra, X. Jiang, M. T. Lichtman, Y. Sun, M. Ebert and M. Saffman, “Rydberg-Mediated Entanglement in a Two-Dimensional Neutral Atom Qubit Array”, *Phys. Rev. Lett.* 123, 230501, 2019, describe an extremely reliable two-qubit Rydberg blockade and entanglement of a pair of atoms in a large two-dimensional qubit arrangement. Improved experimental methods increased the observed Bell state quality to $F_{Bell}$=0.86(2). Taking into account errors during state preparation and measurement, this results in an accuracy of 0.88. Taking into account errors during single-qubit operations, the conclusion is drawn that one Bell state, the Bell state produced by the Rydberg-mediated CZ gate, has an accuracy of 0.89. A comparison with a detailed error model based on quantum process matrices shows that the finite atom temperature and laser noise are the most important error sources that contribute to the observed inaccuracy of the gate.

I. S. Madjarov, J. P. Covey, A. L. Shaw, J. Choi, A. Kale, A. Cooper, H. Pichler, V. Schkolnik, J. R. Williams, and M. Endres, “High-fidelity entanglement and detection of alkaline-earth Rydberg atoms”, *Nature Physics* 16, 857, 2020, describe trapped neutral strontium atoms as a platform for quantum science on which entanglement records were set with highly excited Rydberg states. The controlled production of two-qubit entanglements had previously been restricted to alkali metal atoms, however, and so the utilization of atoms with more complex electronics structures constitutes an open field which might lead to improved and to fundamentally different applications such as quantum-amplified optical clocks. An approach is demonstrated which makes use of the divalent electron structure of individual alkaline earth metal Rydberg atoms. Qualities for the Rydberg state detection, single-atom Rabi operations and two-atom entanglement are found which surpass values published prior to that.

F. Meinert, C. Hölzl, M. Ali Nebioglu, A. D'Arnese, P. Karl, M. Dressel, and M. Scheffler, "Indium tin oxide films meet circular Rydberg atoms: Prospects for novel quantum simulation schemes", *Phys. Rev. Research* 2, 023192, 2020, describe long-lived circular Rydberg atoms in association with coherence times in Rydberg-based quantum simulations. An approach for stabilizing circular Rydberg states so as to withstand spontaneous and black body-induced decay is disclosed which makes use of a suppression capacitor composed of thin indium tin oxide (ITO) films, the reflection of microwaves being combined with transparency in the visible spectral range. For this purpose, a detailed characterization of such layers is carried out using complementary spectroscopic methods at GHz and THz frequencies and conditions are determined under which circular state lifetimes of up to ten milliseconds are achieved in an environment at room temperature.

Engel, Felix, et al. "Observation of Rydberg blockade induced by a single ion." *Physical Review Letters* 121.19 (2018): 193401, describe the long-range interaction of a single ion with a highly excited ultracold Rydberg atom and report the direct observation of the ion-induced Rydberg excitation blockade over distances of dozens of micrometers. The hybrid ion-atom system used is produced directly from an ultracold atom ensemble by photoionization of a single Rydberg excitation, with use being made of a two-photon scheme specifically suitable for producing an ion with very low energy. The movement of the ion is precisely controlled by small electric fields, which makes it possible to analyze the blockade mechanism for a series of principal quantum numbers. Finally, the suitability of the ion as a highly sensitive sensor for electric fields on the basis of single atoms is investigated.

U.S. Pat. No. 9,934,469 B1 describes a method for producing an entangled quantum state of an atomic ensemble. The method comprises loading each atom of the atom ensemble into a corresponding optical trap; putting each atom of the atom ensemble into an identical first atomic quantum state by impingement of pump radiation; approaching the atoms of the atom ensemble to within a dipole-dipole interaction length of one another; Rydberg-dressing the atom ensemble; during the Rydberg-dressing operation, exciting the atom ensemble with a Raman pulse tuned to stimulate a ground-state hyperfine transition from the first atomic quantum state to a second atomic quantum state; and separating the atoms of the atom ensemble by more than a dipole-dipole interaction length.

Despite the advantages that have already been able to be achieved by means of the known apparatuses and methods, various technical challenges still remain. In particular, electric fields that are not reliably controlled constitute a technical limitation for the quality of quantum operations with Rydberg atoms. In principle, electrodes or else Faraday cages, for example, can be used for shielding and/or controlling electric fields. However, electrodes or Faraday cages for controlling electric fields may restrict optical access to the Rydberg atoms and necessitate access openings for the beam path in the Faraday cage or the electrodes. An optical access with a high numerical aperture is absolutely necessary, however, for quantum computer applications and for optical tweezers. The access openings would thus have to be made very large, which in turn directly adversely affects the shielding action of the electrodes or Faraday cages.

OBJECTIVE OF THE INVENTION

It would therefore be desirable to provide a cell for carrying out quantum optical measurements on at least one atom cloud, a system for carrying out quantum optical measurements on at least one atom cloud, a quantum computer and also a method for carrying out quantum optical measurements on at least one atom cloud which at least substantially avoid the disadvantages of known apparatuses and methods. In particular, the spatial and temporal control of electric fields in a cell for carrying out quantum optical measurements on at least one atom cloud is intended to be reliably ensured without considerably restricting optical access to the atom cloud.

GENERAL DESCRIPTION OF THE INVENTION

This objective is addressed by means of a cell for carrying out quantum optical measurements on at least one atom cloud, a system for carrying out quantum optical measurements on at least one atom cloud, a quantum computer and also a method for carrying out quantum optical measurements on at least one atom cloud having the features of the independent patent claims. Advantageous developments, which can be realized individually or in any desired combination, are presented in the dependent claims.

Hereinafter the terms "exhibit", "have", "comprise" or "include" or any grammatical deviations therefrom are used in a non-exclusive way. Accordingly these terms can refer either to situations in which, besides the features introduced by these terms, no further features are present, or to situations in which one or more further features are present. For example, the expression "A exhibits B", "A has B", "A comprises B" or "A includes B" can refer both to the situation in which no further element aside from B is provided in A (that is to say to a situation in which A consists exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by a person skilled in the art, can also be carried out using other configurations. Similarly, features introduced by "in one embodiment of the invention" or by "in one exemplary embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

In a first aspect of the present invention, a cell for carrying out quantum optical measurements on at least one atom cloud, in particular for use in a quantum computer, is proposed.

The term "quantum optical measurement" as used here is a broad term which is intended to be accorded its customary and familiar meaning as understood by a person skilled in the art. The term is not restricted to a specific or adapted meaning. The term can refer, without restriction, in particular to optical measurements on one or more measurement objects which are subject to quantum mechanical laws. In particular, this can involve measurements in which one or more light beams, in particular laser beams, interact with matter, for example with atoms or molecules, in particular in a vacuum. Quantum optical measurements can include in particular measurements on physical matter in the atomic and/or subatomic size range, such as, for example, on Rydberg atoms, i.e. atoms which are in the Rydberg state, in which for example the outermost electron is on average significantly further away from the center than in the ground state. As is known to a person skilled in the art, a measurement in particular in the field of quantum mechanics influences a state of the measurement object. The quantum optical measurement can relate to a, in particular targeted, manipulation of the state of the measurement object. By way of example, an atom can be energetically excited by a light beam directed at it, for example into a Rydberg state or from one Rydberg state into another Rydberg state.

The term "cell" as used here is a broad term which is intended to be accorded its customary and familiar meaning as understood by a person skilled in the art. The term is not restricted to a specific or adapted meaning. The term can refer, without restriction, in particular to an arbitrary apparatus, in principle, which defines at least one interior in which experiments can be carried out or matter for experiments, in particular for quantum optical experiments, can be received. In particular, the cell can be configured in such a way that quantum optical measurements can be carried out in it. The cell can be configured in particular to shield the quantum optical measurements taking place in it against the environment outside the cell, for example against external mechanical forces such as e.g. vibrations, against ingress of physical matter such as e.g. contaminants, against electromagnetic radiation, against an ambient temperature, against an ambient pressure or against a combination of two or more or all of the influences mentioned. The cell can comprise at least one cell wall. The cell wall can completely enclose at least to the greatest possible extent, in particular completely enclose, a cell interior. By way of example, as will be described in even greater detail below, the cell wall can be completely or partly produced from at least one dimensionally stable transparent material, for example from quartz and/or from glass. The cell can comprise in particular at least one magneto-optical trap (MOT), form an MOT or be part of an MOT. An MOT is, in principle, a vacuum apparatus configured for cooling, in particular for laser cooling, and for storage of atoms, in particular by means of an interaction of magnetic fields and laser beams. The cell can furthermore be configured to manipulate the atoms situated in it in a targeted manner or to influence the quantum optical measurements taking place in it in a targeted manner, or to enable such a manipulation or influencing of the atoms situated in it, as will be explained in even greater detail further below.

The term "atom cloud" as used here is a broad term which is intended to be accorded its customary and familiar meaning as understood by a person skilled in the art. The term is not restricted to a specific or adapted meaning. The term can refer, without restriction, in particular to an arbitrary ensemble, in principle, or a collection of atoms or else molecules. The atom cloud can be locally restricted, in particular by the cell. The atom cloud can comprise atoms of arbitrary chemical elements in an arbitrary number and in an arbitrary physical, in particular internal quantum mechanical, state. In particular, the atom cloud can comprise atoms in an arbitrary energetic state. In particular, the atom cloud can comprise a plurality of atoms, a plurality of molecules or else a plurality of ions and/or isotopes. In particular, the atom cloud can comprise exclusively atoms of a single chemical element. By way of example, the atom cloud can comprise rubidium atoms and/or strontium atoms. In principle, however, quantum optical measurements are also possible on other elements or else on molecules, alkali metal elements and/or alkaline earth metal elements often being used.

The term "quantum computer" as used here is a broad term which is intended to be accorded its customary and familiar meaning as understood by a person skilled in the art. The term is not restricted to a specific or adapted meaning. The term can refer, without restriction, in particular to a processor and/or data storage unit which operates on the basis of quantum mechanical states, quantum mechanical coherence and/or quantum entanglements. Numerous embodiments of quantum computers are generally known to a person skilled in the art. Information in quantum computers is typically represented with the aid of quantum bits, also called qubits. The quantum bits are typically realized by way of different states of a quantum mechanical two-state system, for example by way of the spin of an electron or by way of energy states of an atom. Other realizations are also possible. Quantum mechanical superpositions of the states are possible. A plurality of quantum bits can be combined in quantum registers. The state of a quantum register can be quantum mechanically entangled. Computing operations, also called quantum operations here, can be carried out with the aid of quantum gates. The quantum gates are typically realized by way of elementary physical manipulations of one or more quantum bits. By way of example, the spin of an electron can be influenced by way of an applied magnetic field or the energy state of an atom can be optically influenced by way of gate lasers, i.e. incident laser pulses.

The cell comprises a control unit for controlling electric fields at the location of the atom cloud. The term "control unit" as used here is a broad term which is intended to be accorded its customary and familiar meaning as understood by a person skilled in the art. The term is not restricted to a specific or adapted meaning. The term can refer, without restriction, in particular to an integral or multipartite apparatus configured to influence, to control, to open-loop control or to closed-loop control one or more physical influencing variables in a targeted manner. In the present case, the control unit is part of the cell and is configured to influence electric fields at the location of the atom cloud within the cell in a targeted manner, for example to increase and/or to decrease them in at least one spatial direction. The control unit can in particular also act as a Faraday cage and be configured to at least substantially shield external electric fields at the location of the atom cloud, for example to damp them to less than 0.1% of their value, in particular to less than 0.01% of their value and in particular to less than 0.001% of their value.

The control unit comprises:

- at least one housing having at least one interior for receiving the atom cloud and having at least one opening for introducing the atoms of the atom cloud into the interior; and
- at least two electrodes,
  - wherein the electrodes, independently of one another, are able to be subjected to electrical potentials and are configured to influence at least one electric field in the interior,
  - wherein the electrodes are mechanically connected to the housing,
  - wherein at least one of the electrodes is at least partly formed by at least one optical window through which at least one light beam for interaction with the atom cloud is able to be radiated into the interior, wherein the optical window comprises at least one transparent substrate and at least one transparent electrically conductive coating of the substrate.

The term "housing" as used here is a broad term which is intended to be accorded its customary and familiar meaning as understood by a person skilled in the art. The term is not restricted to a specific or adapted meaning. The term can refer, without restriction, in general to a mechanical structure, for example a rigid element or a rigid apparatus, which is configured to enclose one or more further elements. In particular, the term housing can relate to a container configured to receive the atom cloud. The housing can be at least part of an MOT and/or be used in an MOT. The housing can be situated within the cell, in particular within the at least one cell wall of the cell. The electrodes can be mounted on the housing within the cell. The electrodes can be an integral part of the housing. The housing can comprise electrically insulating elements, for example ceramic elements. The electrodes can be connected to one another via the electrically insulating elements. Other embodiments are also possible.

The term "electrode" as used here is a broad term which is intended to be accorded its customary and familiar meaning as understood by a person skilled in the art. The term is not restricted to a specific or adapted meaning. The term can refer, without restriction, in particular to an apparatus or to an element which is at least partly electrically conductive and/or configured to transport electrical charges, in particular electrons. In particular, the electrode can be wholly or partly produced from at least one metallic material and/or at least one semiconducting material. The electrode can be configured for example as a free-standing, self-supporting element or can also be applied to at least one carrier element. As will be explained in even greater detail below, the electrode can be electrically contacted via at least one electrode lead and be able to be subjected to at least one potential via the at least one electrode lead. The electrode can have at least one electrode area or electrode surface which can be a starting or end point for electric field lines of an electric field.

The term "be able to be subjected to" as used here is a broad term which is intended to be accorded its customary and familiar meaning as understood by a person skilled in the art. The term is not restricted to a specific or adapted meaning. The term can refer, without restriction, in particular to the fact that an electrical potential can be applied to the electrodes. In particular, the electrodes can be configured to be connected to at least one voltage source, such that via the voltage source an electrical potential can be applied to the electrodes, in particular a dedicated individual electrical potential to each electrode. By way of example, different electrical potentials can be applied to each of the electrodes. The electrical potentials can be suitable for generating electric fields in the range of typically 1 μV/cm to 1 kV/cm. For this purpose, the electrodes can comprise at least one electrically conductive material, for example a metal. As will be explained in even greater detail below, the electrodes, for being subjected to the electrical potentials, can each be electrically connected to at least one electrical terminal, for example at least one plug connector, via which the potentials can be applied to the electrodes. The electrical terminals can for example be arranged outside the cell and/or be accessible from outside the cell. The electrical terminals can comprise for example standard plug connectors, for example sub-D connectors, coaxial connectors, or high-voltage coaxial connectors. Coaxial connectors can comprise BNC connectors or SMA connectors. High-voltage coaxial connectors can comprise MHV connectors or SHV connectors.

As explained above, the electrodes are mechanically connected to the housing. This can be done in a number of ways, as will be explained in even greater detail below. In particular, the electrodes can be wholly or partly held by at least one holding element which is part of the housing and/or is mechanically connected to the housing. Alternatively or additionally, the electrodes can also wholly or partly be integrated into the housing and/or form part of the housing itself.

As explained, at least one of the electrodes is formed by at least one optical window through which at least one light beam for interaction with the atom cloud is able to be radiated into the interior of the housing. The term "optical window" as used here is a broad term which is intended to be accorded its customary and familiar meaning as understood by a person skilled in the art. The term is not restricted to a specific or adapted meaning. The term can refer, without restriction, in particular to an optical component or an element comprising at least one transparent material, wherein the transparent material is in particular at least partly transparent in at least one spectral range of the light beam. The optical window can comprise at least one optical filter and/or at least one polarizer. The optical window can have in particular a high surface quality, for example a quality with fluctuations or roughnesses, of less than $\lambda/4$, in particular of less than $\lambda/10$, where $\lambda$, refers to the wavelength of the light beam. Possible wavelengths are specified in even greater detail below.

The term "transparent" as used here is a broad term which is intended to be accorded its customary and familiar meaning as understood by a person skilled in the art. The term is not restricted to a specific or adapted meaning. The term can refer, without restriction, in particular to complete or at least partial transmissivity to electromagnetic radiation, in particular to light. The transparency can relate to at least one restricted spectral range. Further examples are explained below.

The term "substrate" as used here is a broad term which is intended to be accorded its customary and familiar meaninging as understood by a person skilled in the art. The term is not restricted to a specific or adapted meaning. The term can refer, without restriction, in particular to a carrier element or a combination of carrier elements configured to carry at least one further element, in particular at least one electrical functional element. The substrate can be for example at least one plane substrate, having at least one smooth, in particular planar, surface. By way of example, the substrate can be a plate-shaped or disk-shaped substrate, having two surfaces opposite one another, in particular planar surfaces. By way of example, the substrate can be a substrate composed of at least one transparent material such as, for example, glass and/or quartz. In this case, monolayer substrates or else substrates having a multilayered layer construction are possible. The substrate can have for example a round, oval or polygonal cross section. The substrate can have for example a thickness of 0.1 mm to 15 mm, for example a thickness of 3 mm to 8 mm. However, other dimensions are also possible, in principle.

The term “electrically conductive” as used here is a broad term which is intended to be accorded its customary and familiar meaning as understood by a person skilled in the art. The term is not restricted to a specific or adapted meaning. The term can refer, without restriction, in particular to a property of an element, for example of a layer or of a macroscopic element, which consists in the fact that the element can conduct electric current or can transport electrical charge carriers, in particular electrons. In particular, this can thus involve an element having free charge carriers, for example electrons or defect electrons. The element, particularly if a volume element is involved, can have an electrical conductivity of at least $10^{-5}$ S/m, in particular an electrical conductivity of at least $10^{-3}$ S/m, at least $10^{0}$ S/m or more. In the case of metallic elements, the element can have in particular a conductivity of at least $10^{3}$ S/m, in particular of at least $10^{5}$ S/m or even of at least $10^{6}$ S/m. In the case of a layered element or a conductive coating, the conductive coating can have in particular a sheet resistance of not more than 1000 ohms/sq, for example a sheet resistance of not more than 100 ohms/sq, in particular of not more than 10 ohms/sq. The conductive element can be for example wholly or partly produced from a metallic material and/or a semiconducting material.

The term “coating” as used here is likewise a broad term which is intended to be accorded its customary and familiar meaning as understood by a person skilled in the art. The term is not restricted to a specific or adapted meaning. The term can refer, without restriction, in particular to a layer or a layer construction composed of a plurality of layers, i.e. to a continuous quantity of at least one substance or substance mixture applied to a substrate areally. In particular, the coating as such can have a thickness in the range of less than 1 mm, for example a thickness of 1 nm to 50 μm, in particular a thickness of 20 nm to 10 μm. Typical thicknesses of conductive coatings which are used in the semiconductor field and which can be used in the present case, too, are for example in the range from 10 nm to 10 μm. By way of example, as explained below, at least one transparent conductive or semiconducting metal oxide can be used, for example indium tin oxide, which typically has a thickness in the range of 10 nm to 2000 nm. However, other layer thicknesses are also usable, in principle.

The term “light” as used here is a broad term which is intended to be accorded its customary and familiar meaning as understood by a person skilled in the art. The term is not restricted to a specific or adapted meaning. The term can refer, without restriction, in particular to electromagnetic radiation in at least one spectral range selected from the visible spectral range, the ultraviolet spectral range and the infrared spectral range. The term “light beam” as used here is a broad term which is intended to be accorded its customary and familiar meaning as understood by a person skilled in the art. The term is not restricted to a specific or adapted meaning. The term can refer, without restriction, in particular to a quantity of light which is emitted and/or directed in a specific direction. The light beam can be in particular a coherent light beam. The light beam can comprise in particular at least one laser beam. The light beam can be at least part of optical tweezers, i.e. for example securely hold atoms and/or move them in a targeted manner. The light beam can be used as an alternative or in addition to the laser cooling of atoms. The light beam can be at least part of a gate laser, with the aid of which quantum operations can be carried out, for example by way of energetic excitations of atoms into Rydberg states.

The control unit such as has been described above and such as will be explained in even further detail by way of example below can be used to shield and/or to influence, i.e. overall to control, electric fields at the location of the atom cloud in an effective manner. In contrast to simple Faraday cages, the configuration in which at least one of the electrodes is formed by the at least one optical window with the electrically conductive coating affords the possibility both of radiating light into the interior practically without any disturbance and of influencing the electric field in the interior of the housing by way of the conductive coating and the subjecting thereof to a suitable electrical potential. In this case, as will be explained in even greater detail below, one or more of the electrodes can be configured with the at least one optical window with the conductive coating, whereas optionally one or more further electrodes can be present which are likewise able to be subjected to an electrical potential and which can be produced for example from a metallic material, for example high-grade steel. In this way, transparent and nontransparent electrodes can be combined with one another. In particular, the transparent electrodes can be integrated into the housing or can be connected to the housing in such a way that a plurality of light beams can be radiated into the interior from different spatial directions, for example at an angle of 0° to 180° with respect to one another. In this way, the atom cloud can be irradiated from different spatial directions. While metal electrodes typically have the disadvantage that openings have to be provided for radiating in light, which openings weaken the shielding effect of the electrodes or influence the geometry of the electric field, the at least one optical window can be configured with an arbitrary size, in principle, such that for example light can also be radiated into the interior via an optical unit with a high numerical aperture, in particular with a high opening angle. The latter is of importance in particular for optical tweezers, in the case of which the shortest possible Rayleigh length in the region of the focus is of importance. Incidence through metal electrodes with corresponding holes in this case typically requires hole dimensions which have a considerable adverse influence on the shielding effect or the field geometry in the interior. This problem can largely be avoided by means of the proposed control unit having the housing and the at least two electrodes, at least one of which is configured as an optical window and has the conductive coating on the transparent substrate. The housing can be configured for example as a Faraday cage, for example by its being wholly or partly produced from an electrically conductive material, for example from high-grade steel, wherein light can nevertheless be radiated into the interior through the at least one electrode with the optical window. In particular, the control unit can be configured in such a way that, by means of the housing and the at least two electrodes, a Faraday cage is formed, by way of which the atom cloud is shielded from electric fields in all three spatial directions and/or by way of which the electric field in the interior is able to be influenced in all three spatial directions by means of the electrodes being correspondingly subjected to electrical potentials.

The at least one electrode with the at least one optical window can be at least partly embodied as a metallic plate with at least one opening, in particular as a high-grade steel plate. As an alternative to high-grade steel, however, other metals are also conceivable. By way of example, the metallic plate can comprise titanium. The at least one opening can have an arbitrary geometry, in principle, for example a round or polygonal geometry. By way of example, the opening can be configured as circular or oval. Examples are explained in even greater detail below. The opening can have for example a diameter or equivalent diameter of 1 mm to 100 mm, for example a diameter or equivalent diameter of 10 mm to 50 mm. The use of high-grade steel generally allows electric fields to be switched on a scale of 10 ns. Moreover, high-grade steel is well suited to use in ultrahigh vacuum. The at least one optical window can be integrated into the opening or can completely or partly cover or screen the opening from above or from below, for example. In this regard, the optical window can in particular at least partly, in particular completely, cover the opening. By way of example, the optical window can be arranged in front of the opening at an arbitrary distance from the opening, for example at a distance of not more than 10 mm. Alternatively or additionally, the optical window can have dimensions at least exactly equal to those of the opening, in particular can exhibit larger dimensions than the opening.

The at least one electrode with the at least one optical window can comprise at least one holding unit. The holding unit can be configured to hold the optical window. The holding unit can furthermore be configured to electrically contact the transparent electrically conductive coating. The term "holding unit" as used here is a broad term which is intended to be accorded its customary and familiar meaning as understood by a person skilled in the art. The term is not restricted to a specific or adapted meaning. The term can refer, without restriction, in particular to an arbitrary apparatus configured to fix, carry, support and/or hold an object directly and/or indirectly. The holding unit can be configured to fix the object with the aid of at least one further object. By way of example, the holding unit can be configured to press the object against the further object. By way of example, the holding unit can be configured to hold the optical window outside the interior of the housing of the cell in front of the opening of the metallic plate, in particular at a fixed distance from the opening and in particular plane-parallel to the cell wall. The holding unit can comprise at least one active or passive actuator, for example at least one spring element. In this regard, the holding unit can comprise at least one mechanical spring, for example a helical compression spring, with the aid of which a fixed distance between the optical window and the opening can be fixed, for example by way of pressing against the mechanical spring. By way of example, the holding unit can adjoin a cell wall of the cell and can be configured to be clamped in between the cell wall and the opening with the aid of the mechanical spring. The use of mechanical springs generally allows the control unit to be heated to above 100° C. without generating a fracture of glass elements. Such heating processes are generally necessary in order to generate a high vacuum, for example. The holding unit can furthermore comprise at least one spacer, for example a spacer with respect to the cell wall, i.e. a spacer adjoining the cell wall. The holding unit can comprise at least one mechanically robust material, for example a metal. Other embodiments are likewise possible.

The holding unit can in particular be configured to hold the optical window in a clamping mount. The clamping mount can have at least one electrically conductive element, for example a metallic frame, in particular a high-grade steel frame, which is pressed onto the transparent electrically conductive coating. The term "clamping mount" as used here is a broad term which is intended to be accorded its customary and familiar meaning as understood by a person skilled in the art. The term is not restricted to a specific or adapted meaning. The term can refer, without restriction, in particular to an arbitrary apparatus configured to hold, in particular to clamp, an object, in particular the optical window, in a force-locking manner. In particular, the clamping mount can be configured to clamp the optical window at at least one edge of the optical window, such that in particular a central part of the optical window remains freely accessible. The clamping mount can thus be configured to fix the optical window or at least to support a fixing of the optical window. By way of example, the clamping mount can be pressed against the mechanical spring or be subjected to a force by the mechanical spring. The mechanical spring can be introduced for example between the substrate and a frame of the holding unit. The mechanical spring can contribute to enabling the holding unit and the optical window to be heated to above 100° C. without the optical window breaking. Such heating can take place for example during the generation of an ultrahigh vacuum. The clamping mount can be configured to protect the optical window, for example against pressure being exerted on the optical window directly by the mechanical spring. By way of example, the clamping mount can be configured to be clamped in between the mechanical spring and the spacer adjoining the cell wall. The clamping mount can comprise at least one mechanically robust material, for example a metal. Other embodiments are likewise possible.

The at least one holding unit can be configured in at least one of the following ways:

- the holding unit can be an integral part of the housing;
- the holding unit can be connected to the housing via at least one connection element, in particular via at least one connection pin.

The term "integral part" as used here is a broad term which is intended to be accorded its customary and familiar meaning as understood by a person skilled in the art. The term is not restricted to a specific or adapted meaning. The term can refer, without restriction, in particular to the fact that a first object is completely or at least substantially incorporated in a second object and/or embodied in one piece with the second object. In particular, the holding unit can be incorporated in the housing. By way of example, the holding unit can form a part of the housing, in particular of the housing produced from high-grade steel.

The term "connection element" as used here is a broad term which is intended to be accorded its customary and familiar meaning as understood by a person skilled in the art. The term is not restricted to a specific or adapted meaning. The term can refer, without restriction, in particular to an arbitrary apparatus configured to mechanically couple two objects to one another, for example to connect or to couple them to one another at least loosely, but preferably also fixedly. The connection element can comprise in particular at least one connection pin. By way of example, the connection pin can be mounted onto the housing from outside. By way of example, the holding unit, in particular the clamping mount, can comprise drilled holes corresponding to the dimensions of the connection pin, such that the holding unit is able to be plugged onto the connection pin. By way of example, the mechanical spring can be able to be plugged onto the connection pin. Other embodiments are likewise possible. The holding unit can in particular be connected to the housing or be embodied as an integral part of the housing in such a way that a position and/or orientation of the at least one optical window relative to the interior and/or to a vacuum cell accommodating the housing, in particular a glass cell, is fixed, is defined or at least adjustable.

The cell can furthermore comprise at least two electrical terminals for connection to at least one voltage source. The electrical terminals can be electrically connected to the electrodes. In particular, at least one terminal in each case can be connected to at least one electrode in each case. In this way, the electrodes can be able to be subjected to electrical potentials. The electrical terminals can comprise in particular releasable electrical terminals such as plug connectors, for example. The electrical terminals can be connected to the respective electrodes via electrical connections, for example. The electrical connections can comprise cable connections, for example. In this regard, for example, in each case at least one terminal can be connected to in each case at least one of the electrodes via at least one electrical connection, for example a cable connection. The connections, for example the cable connections, can be provided for example with insulations compatible with high vacuum, for example Kapton insulations. The cell can have a high-vacuum region, for example. The housing and the electrodes can be arranged in the high-vacuum region. The electrical terminals can be arranged for example wholly or partly outside the high-vacuum region, such that they are contactable from outside, for example for connection to at least one voltage supply and/or at least one electrical controller or electrical control unit.

The term "high-vacuum region" as used here is a broad term which is intended to be accorded its customary and familiar meaning as understood by a person skilled in the art. The term is not restricted to a specific or adapted meaning. The term can refer, without restriction, in particular to an evacuated or evacuatable space, in particular having a pressure in the range of less than $10^{-3}$ mbar, in particular a pressure of less than $10^{-6}$ mbar, for example a pressure of less than $10^{-9}$ mbar, typically down to $10^{11}$ mbar. As is known to a person skilled in the art, a pressure of $10^{-9}$ mbar can be generated for example with the aid of turbomolecular pumps, also called turbo pumps. Rotary vane pumps, for example, can be used as pre-pumps. For a pressure of less than $10^{-9}$ mbar, it is possible more widely to use ion pumps, titanium sublimation pumps or non-evaporable getter (NEG) pumps. The high-vacuum region can be sealed off toward the outside at least to the greatest possible extent, in particular apart from accesses for the aforementioned pumps and/or apart from electrical bushings, for example electrical bushings via which the electrical terminals are connected to the electrodes. In particular, the cell interior of the cell for carrying out quantum optical measurements can be at least in part a high-vacuum region. The cell can thus be at least partly suitable for high vacuum.

As described in greater detail below, for this purpose the cell can comprise in particular at least one vacuum cell. The cell can be at least partly heatable. In the cell, mechanical connections and/or electrical connections and/or electrical insulations can be implemented in a manner free of adhesive bonding and/or free of soldering at least to the greatest possible extent, in particular completely. All materials in the cell can have extremely low outgassing rates. By way of example, it is possible to use high-grade steel, Marcor, alumina, Kapton, tungsten and/or quartz glasses with an ITO coating and/or antireflection coating. The control unit can be accommodated in the vacuum cell. The vacuum cell can be embodied as a glass cell, for example.

As explained above, the optical window comprises at least one transparent substrate and at least one transparent electrically conductive coating of the substrate. The electrically conductive coating can comprise in particular at least one transparent conductive oxide (TCO), in particular at least one transparent conductive oxide selected from the group consisting of tin oxide and indium tin oxide (ITO). One advantage of such TCOs consists in their good optical transparency properties and their producibility with high electrical and optical quality. In particular, coated substrates comprising ITO are available with high layer quality since these are used in optoelectronics and semiconductor technology. The coating can have an arbitrary layer thickness, in principle, for example in the range of 1 nm to 50 μm, in particular in the range of 10 nm to 2000 nm. The coating can comprise in particular at least one thin layer film. In particular, the coating can have a layer thickness in the nm range or in the μm range. The coating can comprise a combination of a plurality of layers lying one above another. In particular, the coating can comprise exclusively one layer, for example an ITO layer. The substrate can comprise at least one material selected from the group consisting of quartz glass and borosilicate glass, since such glasses are available with high optical quality. However, other materials for the substrate and/or the coating are also possible, in principle.

The at least one optical window can have in particular a transparency of at least 10%, in particular at least 80% and in particular at least 85% in a wavelength range of 400 nm to 900 nm, in particular in a wavelength range of 300 nm to 1000 nm. These values are readily attainable in particular with quartz glass or borosilicate glass as substrate and with a corresponding ITO coating.

The electrically conductive coating can be applied at least to a side of the substrate facing the interior. In particular, exclusively conductive elements such as the conductive coating, for example, can be installed in a direct line of sight relative to the atom cloud. Nonconductive elements such as isolators or antireflection coatings, for example, can form disturbing electrical potentials, so-called patch potentials, and thereby reduce the stability of the electric field in the interior and should therefore typically not be installed in a direct line of sight relative to the atom cloud. The optical window can have at least one antireflection coating. The antireflection coating can be applied for example on the side facing away from the interior and/or as an intermediate layer between substrate and conductive coating.

At least two of the electrodes can be arranged on mutually opposite sides in relation to the interior. This enables good influencing of the electric field in the interior by means of corresponding application of electrical potentials. In particular, at least two pairs of electrodes can be provided, wherein the at least two pairs of electrodes are arranged in such a way that connecting lines between the electrodes of the pairs intersect in the interior, preferably at the location of the atom cloud. In this way, it is possible to influence an electric field in at least two spatial directions or dimensions in the interior.

In particular, at least three pairs of electrodes can be provided, wherein the connecting lines of the electrodes of the pairs of electrodes preferably intersect at a point in the interior.

As also explained above, the housing can have at least one opening. The optical window can be mechanically connected to the housing in such a way that the light beam is able to be radiated into the interior through the optical window and through the opening. By way of example, the optical window can be connected to the housing with the aid of the holding unit. The opening can penetrate through at least one wall of the housing and taper conically for example in the direction of the interior. Other geometries and embodiments are also possible.

The electrodes can have at least two optical windows, in particular at least three optical windows. The optical windows can be arranged in such a way that a plurality of light beams are able to be radiated from different directions through the optical windows into the interior. In particular, the optical windows can be arranged in such a way that a plurality of light beams are able to be radiated from different directions through the optical windows into the interior, with a respective light beam being radiated in through a respective optical window. Accordingly, the optical windows can be arranged on different walls of the housing, for example on opposite walls of the housing. Other embodiments are also possible. In particular, the electrodes can be integrated into the housing or can be formed by the housing such that a Faraday cage arises, by means of which an electric field in the interior is shielded in at least one dimension, preferably in at least two dimensions, with preference in three dimensions, or is able to be influenced by means of the electrodes being subjected to corresponding electrical potentials. In this regard, in particular, the electrodes can be arranged spatially with respect to the interior in such a way that field components of the electric field in the interior are able to be influenced in at least one spatial direction, preferably in at least two spatial directions, in particular in three spatial directions, by means of the electrodes. The arrangement and/or the geometry of the electrodes can in particular be such that a homogeneous electric field is generated in the interior. The control unit can comprise for example six individually controllable electrodes. The electrode size or electrode area can typically be a few $cm^2$, for example 0.5 $cm^2$ to 100 $cm^2$, in particular 1 $cm^2$ to 50 $cm^2$. The distances between the electrodes can typically be a few mm, for example 0.5 mm to 200 mm, in particular 1 mm to 100 mm.

The control unit can furthermore comprise at least one ion detector. The ion detector can be arranged between the electrodes and the cell wall. The ion detector can in particular be configured to detect Rydberg atoms after ionization has taken place. The ion detector can furthermore be configured to detect Rydberg atoms at a single particle level with a temporal resolution on the ns scale.

The housing can be at least partly produced from at least one electrically conductive material. In particular, the housing can be at least partly produced from at least one metallic material, for example from high-grade steel. In this regard, the housing can have for example walls produced wholly or partly from metal. The housing can have for example one or more metallic segments functioning as electrodes, in addition to the at least one optical window. If a plurality of electrode segments are provided, then these can be electrically insulated from one another in order that they can be able to be subjected to electrical potentials separately and independently. In this regard, for example, in the housing a plurality of walls can be configured as electrode segments.

The electrodes, in addition to the at least one optical window, can furthermore have at least one nontransparent electrode. As explained above, the at least one nontransparent electrode can in particular be produced from at least one electrically conductive material and be at least partly integrated into the housing. The nontransparent electrode can at least partly be integrated into a wall of the housing or be formed by at least one wall of the housing. By way of example, the at least one nontransparent electrode can be formed by at least one electrode segment of the housing. The nontransparent electrode can be at least partly produced from high-grade steel, in particular as a high-grade steel plate. If a plurality of such electrode segments are provided, then these can for example be arranged in different walls of the housing and be electrically insulated from one another.

The cell can furthermore comprise at least one vacuum cell. The housing and the electrodes can be introduced into the vacuum cell. The term "vacuum cell" as used here is a broad term which is intended to be accorded its customary and familiar meaning as understood by a person skilled in the art. The term is not restricted to a specific or adapted meaning. The term can refer, without restriction, in particular to a cell configured to enclose, confine and/or store a vacuum, in particular a high vacuum, preferably an ultrahigh vacuum. The vacuum cell can enclose in particular the high-vacuum region. The vacuum cell can comprise at least one inner wall. Accordingly, the high-vacuum region can be sealed off toward the outside at least to the greatest possible extent for example by the inner wall of the vacuum cell. The vacuum cell can be wholly or partly produced from at least one optically transparent material, for example from glass and/or from quartz. Accordingly, the inner wall of the vacuum cell can wholly or partly consist of glass. Further embodiments are likewise possible.

The optical window can be at least partly fixed between the housing and at least one inner wall of the vacuum cell. The optical window can be at least partly accommodated in at least one mount. The mount can be pressed against the inner wall of the vacuum cell by at least one spring element mounted on the housing. In this way, for example, it is possible to produce a well-defined distance and/or a well-defined orientation between the inner wall of the vacuum cell and the optical window. The optical window can be fixed in particular plane-parallel to the inner wall of the vacuum cell. In this way, the optical window can be referenced to the inner wall of the vacuum cell and tilts can be minimized. In general, even small tilts of glass elements in the beam path, in particular in the case of optical microscopy at the diffraction limit, can produce relatively large imaging aberrations, which can be avoided in this way. The mount can at least partly comprise the holding unit described above. The mount can comprise at least one clamping mount, in particular for the optical window, and/or at least one spacer, in particular with respect to the inner wall of the vacuum cell. The spring element can be or comprise the mechanical spring described above and/or a compression spring. By way of example, the spring element can comprise at least one helical compression spring. By way of example, the spring element can be mounted on the housing. By way of example, the mount can adjoin the inner wall of the vacuum cell. By way of example, the mount can be clamped in between the spring element and the inner wall of the vacuum cell. Further embodiments are likewise possible.

The vacuum cell can have at least one flange for connection to a high-vacuum device, in particular a high-vacuum device with for example at least one turbo pump, an ion pump, a titanium sublimation pump and/or a non-evaporable getter (NEG) pump. The term "high-vacuum device" as used here is a broad term which is intended to be accorded its customary and familiar meaning as understood by a person skilled in the art. The term is not restricted to a specific or adapted meaning. The term can refer, without restriction, in particular to an arbitrary apparatus, in principle, which is configured to generate a high vacuum. The high-vacuum device can comprise at least one vacuum pump. In particular, the high-vacuum device can comprise at least one forevacuum pump, for example a rotary vane pump. Furthermore, the high-vacuum device can comprise a high-vacuum pump, for example a turbomolecular pump, also called turbo pump. Furthermore, the high-vacuum device can comprise at least one ion pump, a titanium sublimination pump and/or a non-evaporable getter (NEG) pump. Furthermore, the high-vacuum device can comprise accesses to the vacuum pumps, for example hoses. Connections between elements of the vacuum cell and/or the high-vacuum device can be UHV-suitable. A connection between high-grade steel elements can comprise for example at least one CF flange system. A connection between glass elements or a connection between a glass element and a metal element can comprise for example at least one optical contacting connection, a UHV-suitable adhesive and/or a glass-metal transition. The high-vacuum device can be configured firstly to generate a forevacuum by means of the forevacuum pump and then to generate a high vacuum by means of the high-vacuum pump, in particular in the high-vacuum region and/or in the vacuum cell. The high-vacuum device can comprise a controller configured in particular for controlling the vacuum pumps and/or for monitoring the vacuum generated. The high-vacuum device can comprise at least one pressure measuring instrument, for example a mechanical Bourdon tube pressure gauge and/or an ionization vacuum gauge.

The vacuum cell can be embodied at least partly as a transparent vacuum cell, in particular as a glass cell. The cell can furthermore comprise at least one rod mechanism for holding the housing and the electrodes, in particular in the vacuum cell. The rod mechanism can consist of at least one metal. The cell, or the individual components of the cell, can have corresponding receiving apparatuses for the rod mechanism, for example drilled holes. The cell can comprise electrode leads for electrically contacting the electrodes. The electrode leads can be at least partly integrated into the rod mechanism.

In a further aspect of the present invention, a system for carrying out quantum optical measurements on at least one atom cloud is proposed. The system comprises at least one cell according to any of the preceding and/or succeeding embodiments relating to a cell. The system furthermore comprises at least one adjustable voltage source. The voltage source is connected to the electrodes. The at least one electric field in the interior of the housing is adjustable, in particular controllable, by means of the voltage source.

The term "system" as used here is a broad term which is intended to be accorded its customary and familiar meaning as understood by a person skilled in the art. The term is not restricted to a specific or adapted meaning. The term can refer, without restriction, in particular to an apparatus comprising a plurality of interacting or mutually dependent components or elements which form a whole. The components can at least partly interact in order to fulfil at least one common function. At least two components can be handled independently of one another or they can be connected or be connectable.

The term "adjustable voltage source" as used here is a broad term which is intended to be accorded its customary and familiar meaning as understood by a person skilled in the art. The term is not restricted to a specific or adapted meaning. The term can refer, without restriction, in particular to an arbitrary electronic apparatus, in principle, which is configured to generate and/or to monitor a predefined electrical voltage and/or a predefined electric current intensity. The adjustable voltage source can comprise at least one apparatus selected from the group consisting of: a power supply unit; an electrical generator; a voltmeter; an ammeter; an electrical multimeter; a source measure unit (SMU).

The system can furthermore comprise at least one electrical coil for generating at least one magnetic field in the interior. The electrical coil can be configured to generate a homogeneous magnetic field having a predefined magnetic field strength in the interior. By way of example, the at least one coil can comprise a pair of coils, for example a pair of Helmholtz coils.

The system can furthermore comprise at least one light source for generating at least one light beam, in particular at least one laser source. The light source can be arranged in such a way that the light beam is able to be radiated into the interior through the at least one optical window for interaction with the atom cloud. The light beam can function in particular as optical tweezers and/or as a gate laser. The light beam can be used for the laser cooling of the atom cloud.

The system can furthermore comprise at least one optical system. The optical system can be configured to radiate the light beam with a numerical aperture of at least 0.1 through the optical window into the interior. The optical system can be configured in particular to radiate the light beam with a numerical aperture of 0.1 to 0.6, or even higher, through the optical window into the interior. The term "optical system" as used here is a broad term which is intended to be accorded its customary and familiar meaning as understood by a person skilled in the art. The term is not restricted to a specific or adapted meaning. The term can refer, without restriction, in particular to an arbitrary system, in principle, which comprises at least one optical element. The optical element can in particular be selected from the group consisting of: a lens; a stop; a mirror; a beam splitter, a retardation plate. The optical element and/or further elements of the system can be adjustable. The optical system can comprise in particular at least one microscope objective. The microscope objective can be mounted in particular outside the vacuum cell. The microscope objective can be mounted within the vacuum cell. The use of the microscope objective instead of an asphere mounted in the vacuum is generally advantageous for the use of a plurality or focused laser beams, in particular over a wide wavelength range of 300 nm to 1000 nm, in the field of quantum computing. The cell for carrying out quantum optical measurements on at least one atom cloud can be configured in particular to focus laser beams in a diffraction-limited manner to a spot size of hundreds of nanometers, for example 300 nm given a beam radius of 1 μm. As a result, it is possible to produce microtraps in a quantum computer and to carry out local gate operations.

The system can furthermore comprise at least one atom source connected to the cell. The atom source can be configured to introduce atoms, molecules or ions of the atom cloud into the interior. In particular, the atom source can be configured as heatable in order to keep a supply of corresponding atoms, molecules or ions of at least one element or of at least one chemical compound. The atom source can be configured to produce an atom beam. The atom beam can be decelerated by means of laser cooling, for example, which can be achieved by a Zeeman slower. Other methods such as 2D MOTs are likewise conceivable.

In a further aspect of the present invention, a quantum computer is proposed. The quantum computer comprises at least one system according to any of the preceding and/or succeeding embodiments relating to a system. The quantum computer furthermore comprises at least one controller unit for addressing and/or reading out quantum bits in an atom cloud in the interior. The term "controller unit" as used here is a broad term which is intended to be accorded its customary and familiar meaning as understood by a person skilled in the art. The term is not restricted to a specific or adapted meaning. The term can refer, without restriction, in particular to an arbitrary apparatus, in principle, which is configured to control the system for carrying out quantum optical measurements on at least one atom cloud, or at least one of its components, and thereby to carry out quantum operations, for example. In particular, the controller unit can be configured to control the light source. Quantum operations can be carried out with the aid of gate lasers, for example. The gate laser can for example excite an atom and thus address a quantum bit.

In a further aspect of the present invention, a method for carrying out quantum optical measurements on at least one atom cloud is proposed. The method comprises the following steps:

i. providing at least one system according to any of the preceding and/or succeeding embodiments relating to a system;
ii. generating at least one high vacuum, in particular an ultrahigh vacuum, at the location of the cell of the system, in particular in the interior;
iii. introducing at least one atom cloud into the interior of the cell;
iv. radiating at least one light beam through the at least one optical window of the cell, such that the light beam interacts with the atom cloud in the interior of the cell; and
v. subjecting the electrodes of the cell to electrical potentials and adjusting an electric field in the interior by means of the electrodes.

In this case, the method steps can be carried out in the indicated order or in a different order, wherein one or more of the method steps can at least partly also be carried out simultaneously and wherein one or more of the method steps can be repeated a number of times. Moreover, further method steps, independently of whether or not they are mentioned here, can be implemented in addition. For further definitions and embodiments of the method for carrying out quantum optical measurements on at least one atom cloud, reference may be made to the definitions and embodiments of the system and/or of the cell.

In this case, a "high vacuum" can be understood to mean in particular a vacuum having a pressure of less than $10^{-3}$ bar, in particular a pressure of less than $10^{-6}$ bar or even of less than $10^{-9}$ bar. The high vacuum can comprise in particular an ultrahigh vacuum.

The apparatuses according to the invention and the method according to the invention have numerous advantages over known apparatuses and methods. In particular, they allow the performance parameters (Key Performance Indicators, KPIs) for modules for controlling electric fields in quantum computers, in particular in Rydberg quantum computers, to be increased and limitations owing to the lack of control of electric fields to be eliminated. In this regard, stray electric fields can be shielded to a level of below 1 mV/cm. Furthermore, three-dimensional control of the electric field vector in the range of 1 μV/cm to 1 kV/cm with temporal control on the 10 ns scale can be made possible. Furthermore, optical access over a wide wavelength range of 300 nm to 1500 nm can be made possible. Furthermore, high-NA optical qubit control and qubit addressing at the diffraction limit over a wavelength range of 300 nm to 1000 nm in conjunction with a high numerical aperture (NA=0.1 to 0.6 or higher) can be made possible. Furthermore, the module can be ultrahigh-vacuum integrable and ultrahigh-vacuum compatible (pressure<$10^{-11}$ mbar).

In summary, without restricting further possible configurations, the following embodiments are proposed:

Embodiment 1: A cell for carrying out quantum optical measurements on at least one atom cloud, in particular for use in a quantum computer, comprising a control unit for controlling electric fields at the location of the atom cloud, wherein the control unit comprises:

at least one housing having at least one interior for receiving the atom cloud and having at least one opening for introducing the atoms of the atom cloud into the interior; and at least two electrodes, wherein the electrodes, independently of one another, are able to be subjected to electrical potentials and are configured to influence at least one electric field in the interior, wherein the electrodes are mechanically connected to the housing, wherein at least one of the electrodes is at least partly formed by at least one optical window through which at least one light beam for interaction with the atom cloud is able to be radiated into the interior, wherein the optical window comprises at least one transparent substrate and at least one transparent electrically conductive coating of the substrate.

Embodiment 2: The cell according to the preceding embodiment, wherein the at least one electrode with the at least one optical window is at least partly embodied as a metallic plate having at least one opening, in particular as a high-grade steel plate, wherein the optical window at least partly covers the opening.

Embodiment 3: The cell according to either of the preceding embodiments, wherein the at least one electrode having the at least one optical window comprises at least one holding unit, wherein the holding unit is configured to hold the optical window, wherein the holding unit is furthermore configured to electrically contact the transparent electrically conductive coating.

Embodiment 4: The cell according to the preceding embodiment, wherein the holding unit is configured to hold the optical window in a clamping mount, wherein the clamping mount has at least one electrically conductive element which is pressed onto the transparent electrically conductive coating.

Embodiment 5: The cell according to either of the two preceding embodiments, wherein the holding unit is configured in one of the following ways:

the holding unit is an integral part of the housing;

the holding unit is connected to the housing via at least one connection element, in particular via at least one connection pin.

Embodiment 6: The cell according to any of the preceding embodiments, furthermore comprising at least two electrical terminals for connection to at least one voltage source, wherein the electrical terminals are electrically connected to the electrodes.

Embodiment 7: The cell according to the preceding embodiment, wherein the cell has a high-vacuum region, wherein the housing and the electrodes are arranged in the high-vacuum region, wherein the electrical terminals are arranged outside the high-vacuum region.

Embodiment 8: The cell according to any of the preceding embodiments, wherein the electrically conductive coating comprises at least one transparent conductive oxide (TCO), in particular at least one transparent conductive oxide selected from the group consisting of tin oxide and indium tin oxide (ITO).

Embodiment 9: The cell according to any of the preceding embodiments, wherein the substrate comprises at least one material selected from the group consisting of quartz glass and borosilicate glass.

Embodiment 10: The cell according to the preceding embodiment, wherein the at least one optical window has a transparency of at least 10%, in particular at least 80% and in particular at least 85% in a wavelength range of 400 nm to 900 nm, in particular in a wavelength range of 300 nm to 1000 nm.

Embodiment 11: The cell according to any of the preceding embodiments, wherein the electrically conductive coating is applied at least to a side of the substrate facing the interior.

Embodiment 12: The cell according to any of the preceding embodiments, wherein the optical window furthermore has at least one antireflection coating.

Embodiment 13: The cell according to any of the preceding embodiments, wherein at least two of the electrodes are arranged on mutually opposite sides in relation to the interior.

Embodiment 14: The cell according to any of the preceding embodiments, wherein the housing has at least one opening, wherein the optical window is mechanically connected to the housing in such a way that the light beam is able to be radiated into the interior through the optical window and through the opening.

Embodiment 15: The cell according to the preceding embodiment, wherein the opening penetrates through at least one wall of the housing and tapers conically in the direction of the interior.

Embodiment 16: The cell according to any of the preceding embodiments, wherein the electrodes have at least two optical windows, in particular at least three optical windows.

Embodiment 17: The cell according to the preceding embodiment, wherein the optical windows are arranged in such a way that a plurality of light beams are able to be radiated from different directions through the optical windows into the interior.

Embodiment 18: The cell according to any of the preceding embodiments, wherein the electrodes are arranged spatially with respect to the interior in such a way that field components of the electric field in the interior are able to be influenced in at least one spatial direction, preferably in at least two spatial directions, in particular in three spatial directions, by means of the electrodes.

Embodiment 19: The cell according to any of the preceding embodiments, wherein the housing is at least partly produced from at least one electrically conductive material.

Embodiment 20: The cell according to the preceding embodiment, wherein the electrodes, in addition to the at least one optical window, furthermore have at least one nontransparent electrode, wherein the at least one nontransparent electrode is produced from at least one electrically conductive material and is at least partly integrated into the housing.

Embodiment 21: The cell according to the preceding embodiment, wherein the nontransparent electrode is at least partly integrated into a wall of the housing.

Embodiment 22: The cell according to either of the two preceding embodiments, wherein the nontransparent electrode is at least partly produced from high-grade steel, in particular as a high-grade steel plate.

Embodiment 23: The cell according to any of the preceding embodiments, furthermore comprising at least one vacuum cell, wherein the housing and the electrodes are introduced into the vacuum cell.

Embodiment 24: The cell according to the preceding embodiment, wherein the optical window is at least partly fixed between the housing and at least one inner wall of the vacuum cell.

Embodiment 25: The cell according to the preceding embodiment, wherein the optical window is at least partly accommodated in at least one mount, wherein the mount is pressed against the inner wall of the vacuum cell by at least one spring element mounted on the housing.

Embodiment 26: The cell according to any of the three preceding embodiments, wherein the vacuum cell has at least one flange for connection to a high-vacuum device, in particular a high-vacuum device with at least one turbo pump, an ion pump, a titanium sublimation pump and/or a non-evaporable getter (NEG) pump.

Embodiment 27: The cell according to any of the four preceding embodiments, wherein the vacuum cell is at least partly embodied as a transparent vacuum cell, in particular as a glass cell.

Embodiment 28: The cell according to any of the preceding embodiments, furthermore comprising at least one rod mechanism for holding the housing and the electrodes, in particular in the vacuum cell.

Embodiment 29: The cell according to the preceding embodiment, wherein the cell comprises electrode leads for electrically contacting the electrodes, wherein the electrode leads are at least partly integrated into the rod mechanism.

Embodiment 30: A system for carrying out quantum optical measurements on at least one atom cloud, comprising at least one cell as claimed in any of the preceding embodiments, furthermore comprising at least one adjustable voltage source, wherein the voltage source is connected to the electrodes and wherein the at least one electric field in the interior of the housing is adjustable, in particular is controllable, by means of the voltage source.

Embodiment 31: The system according to the preceding embodiment, furthermore comprising at least one electrical coil for generating at least one magnetic field in the interior.

Embodiment 32: The system according to either of the two preceding embodiments, furthermore comprising at least one light source for generating at least one light beam, in particular at least one laser source, wherein the light source is arranged in such a way that the light beam is able to be radiated into the interior through the at least one optical window for interaction with the atom cloud.

Embodiment 33: The system according to the preceding embodiment, furthermore comprising at least one optical system, wherein the optical system is configured to radiate the light beam with a numerical aperture of at least 0.1 through the optical window into the interior.

Embodiment 34: The system according to any of the four preceding embodiments, furthermore comprising at least one atom source connected to the cell, wherein the atom source is configured to introduce atoms of the atom cloud into the interior.

Embodiment 35: A quantum computer, comprising at least one system according to any of the preceding embodiments relating to a system, furthermore comprising at least one controller unit for addressing and/or reading out quantum bits in an atom cloud in the interior.

Embodiment 36: A method for carrying out quantum optical measurements on at least one atom cloud, comprising the following steps:

i. providing at least one system according to any of the preceding embodiments relating to a system;
ii. generating at least one high vacuum, in particular ultrahigh vacuum, at the location of the cell of the system;
iii. introducing at least one atom cloud into the interior of the cell;
iv. radiating at least one light beam through the at least one optical window of the cell, such that the light beam interacts with the atom cloud in the interior of the cell; and
v. subjecting the electrodes of the cell to electrical potentials and adjusting an electric field in the interior by means of the electrodes.

BRIEF DESCRIPTION OF THE FIGURES

Further details and features will become apparent from the following description of exemplary embodiments, in particular in conjunction with the dependent claims. In this case, the respective features can be realized by themselves or as a plurality in combination with one another. The invention is not restricted to the exemplary embodiments. The exemplary embodiments are illustrated schematically in the figures. In this case, identical reference numerals in the individual figures denote elements that are identical or functionally identical or correspond to one another with regard to their functions.

Specifically in the Figures.

DESCRIPTION OF THE EXEMPLARY EMBODIMENTS

Figure 1:
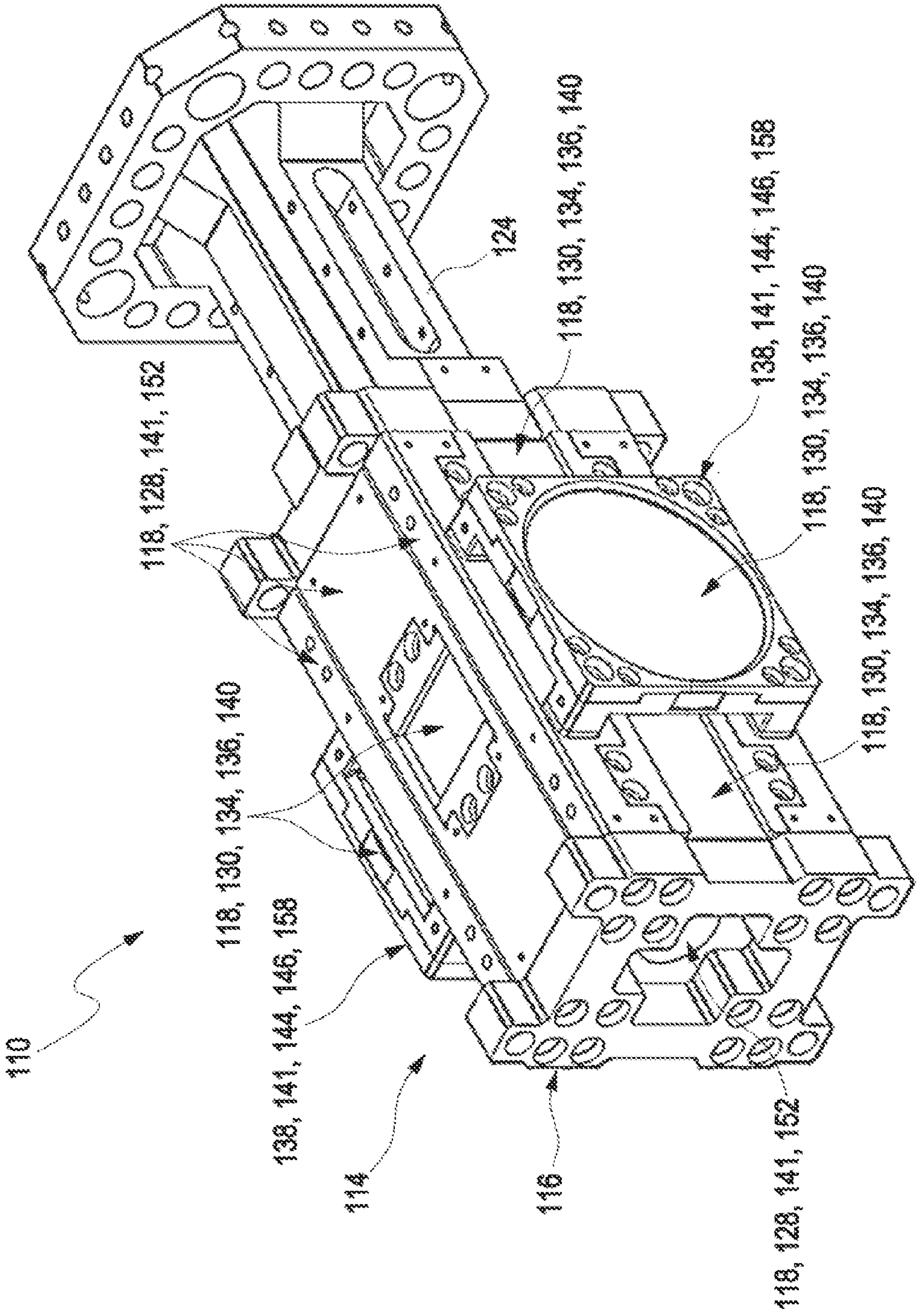
FIG. 1 shows a perspective illustration of one exemplary embodiment of a cell according to the invention for carrying out quantum optical measurements on at least one atom cloud.
Figure 2:
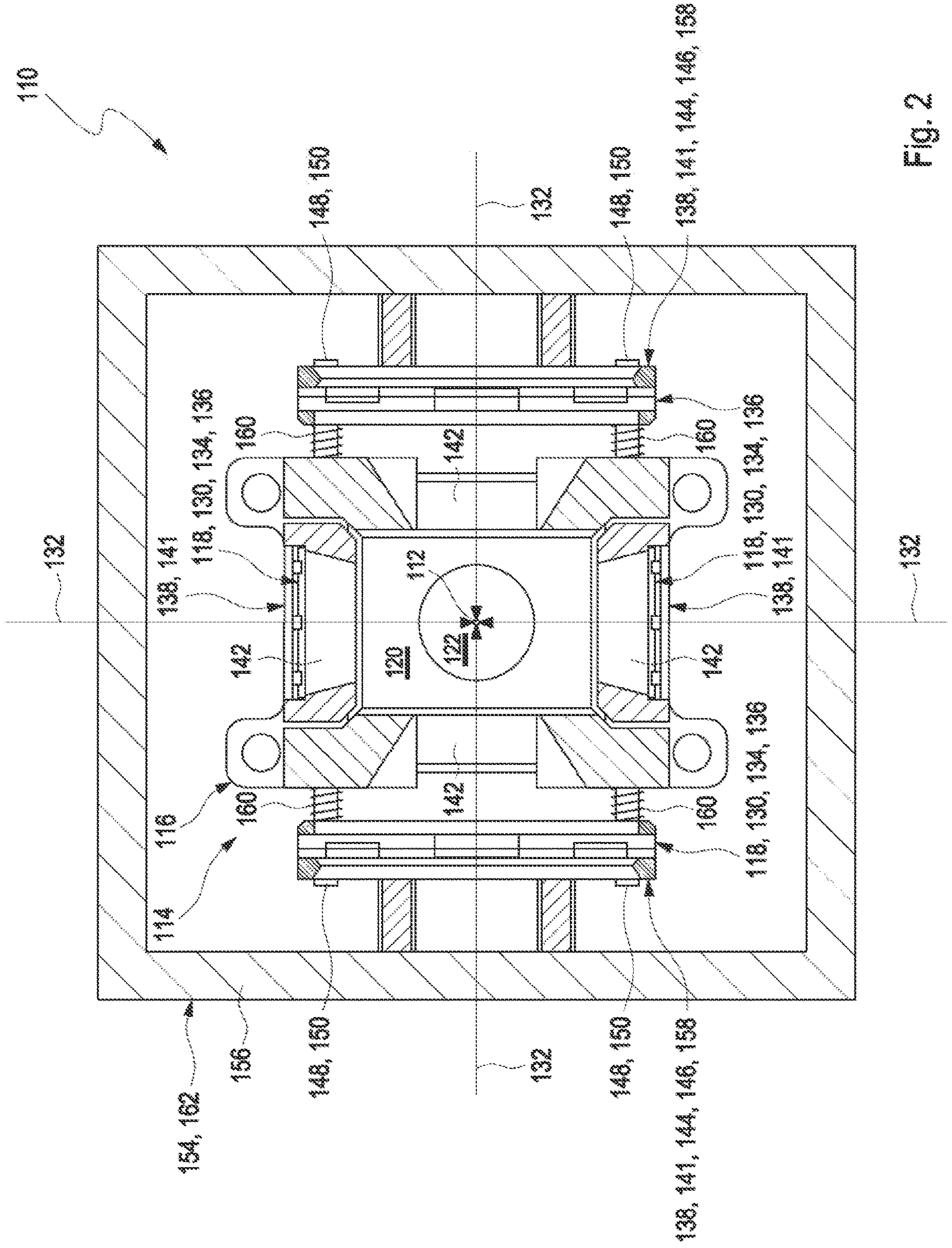
FIG. 2 shows a sectional illustration of the exemplary embodiment in accordance with FIG. 1.
Figure 3:
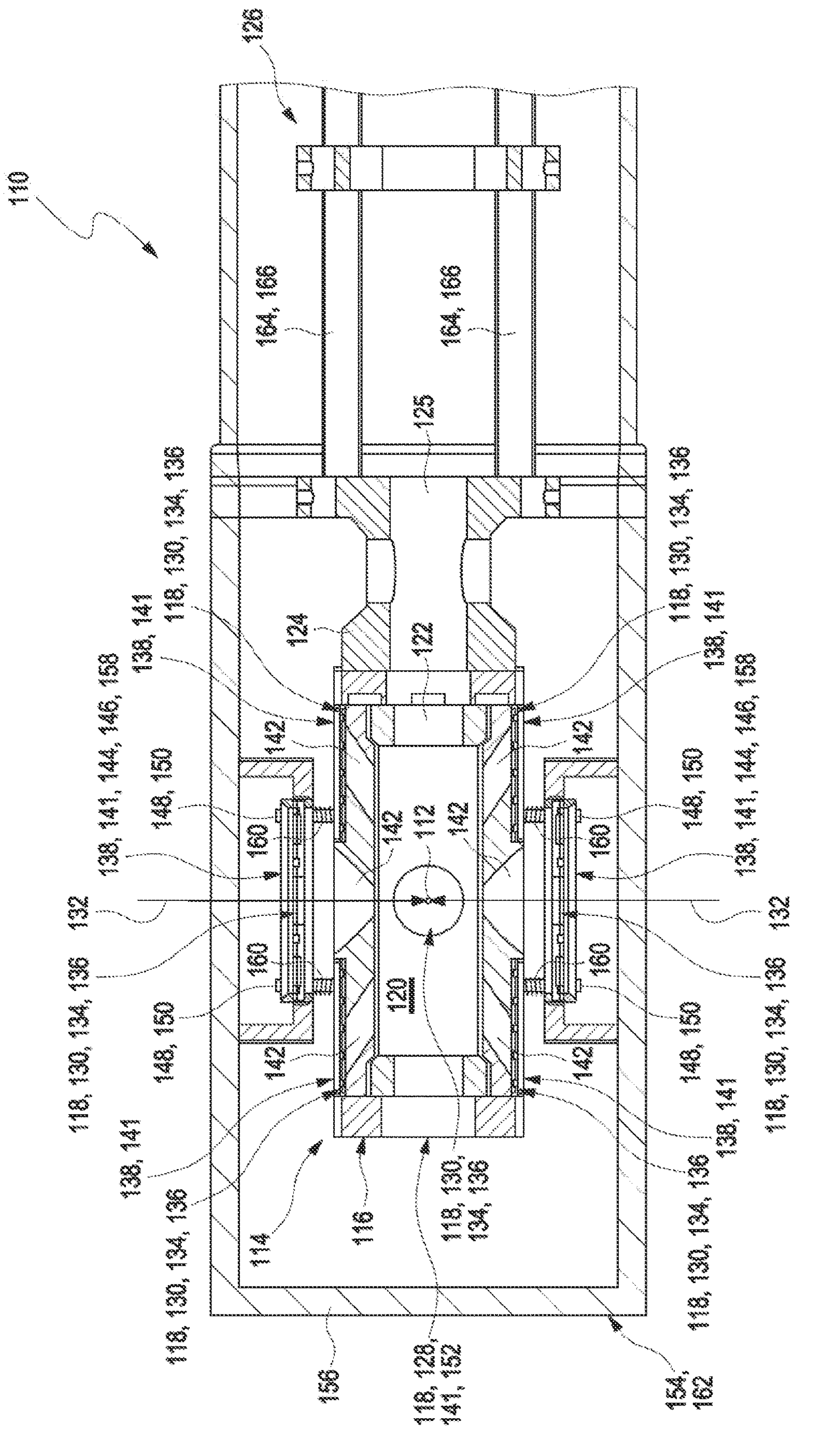
FIG. 3 shows a further sectional illustration of the exemplary embodiment in accordance with FIG. 1, with a sectional plane perpendicular to the sectional plane in FIG. 2.

FIG. 1 shows a perspective illustration of a first exemplary embodiment of a cell 110 according to the invention for carrying out quantum optical measurements on at least one atom cloud, the location of which within the cell 110 is identified symbolically by the reference sign 112 in the figures. FIGS. 2 and 3 show sectional illustrations of the exemplary embodiment in accordance with FIG. 1. FIGS. 1 to 3 are described jointly below.

The cell 110 comprises a control unit 114 for controlling electric fields at the location 112 of the atom cloud. The control unit 114 is part of the cell 110 and constitutes an apparatus configured to influence electric fields at the location 112 of the atom cloud within the cell 110 in a targeted manner, for example to increase and/or to decrease them in at least one spatial direction. In this case, the control unit 114 can in particular also act as a Faraday cage and at least substantially shield external electric fields. The control unit 114 comprises at least one housing 116 and at least two electrodes 118.

The housing 116 comprises at least one interior 120 for receiving the atom cloud. The housing 116 furthermore comprises at least one opening 122 for introducing the atoms of the atom cloud into the interior 120. The atom cloud can be locally restricted in particular in the interior 120 of the cell 110. Furthermore, quantum optical measurements on the atom cloud can be performed in the interior 120. The cell 110 can be configured in particular to shield the quantum optical measurements taking place in it against the environment outside the cell 110, for example against external mechanical forces such as e.g. vibrations, against the ingress of physical matter such as e.g. contaminants, against electromagnetic radiation, against an ambient temperature, against an ambient pressure or against a combination of two or more or all of the influences mentioned.

The opening 122 for introducing the atoms of the atom cloud into the interior 120 can have for example a round or differently shaped geometry. By way of example, atoms from an atom source can be introduced into the interior 120 through said opening 122. For this purpose, for example, as will be explained in even greater detail below, the cell 110 can be coupled to a vacuum apparatus comprising an atom source. Via at least one connection piece 124, the cell 110 can be connectable to further apparatuses, for example the vacuum apparatus having the atom source. The atoms of the atom cloud can be introduced into the interior 120 for example through a tunnel 125 in the connection piece 124 and the opening 122. The connection piece 124 and thus also the cell 110 can be held and/or moved for example by way of at least one carrier construction 126, wherein the carrier construction 126, as will be explained in even greater detail below, can also be used for electrical contacting.

The housing 116 can furthermore at least partly consist of at least one electrically conductive material, for example of high-grade steel. In this regard, the housing 116 can have for example walls produced wholly or partly from metal. The housing 116 can have one or more metallic segments 128, for example, which can function in particular as electrodes 118. The metallic segments 128 can be electrically insulated from one another and thereby be able to be subjected to electrical potentials independently of one another.

The electrodes 118 are able to be subjected to electrical potentials independently of one another. The electrodes 118 are furthermore configured to influence at least one electric field in the interior 120. The electrodes 118 can be arranged spatially with respect to the interior 120 in such a way that field components of the electric field in the interior 120 are able to be influenced in at least one spatial direction, preferably in at least two spatial directions, in particular in three spatial directions, by means of the electrodes 118. In particular, the control unit 114 can be configured in such a way that, by means of the housing 116 and the at least two electrodes 118, a Faraday cage is formed, by way of which the atom cloud is at least partly shielded against electric fields in all three spatial directions and/or by way of which the electric field in the interior 120 is able to be influenced in all three spatial directions by means of the electrodes 118 being correspondingly subjected to electrical potentials. At least two of the electrodes 118 can be arranged on mutually opposite sides in relation to the interior 120. By way of example, the cell 110 can comprise six electrodes 118 distributed around the interior 120 and situated opposite one another in pairs. The electrodes 118 are mechanically connected to the housing 116. As explained, the housing 116 can comprise at least one portion of the electrodes 118. In other words, at least one portion of the electrodes 118 can be integrated into the housing 114.

At least one of the electrodes 118 is at least partly formed by at least one optical window 130. This means that either this at least one electrode 118 is completely formed by the optical window 130, or that the electrode 118 comprises one or more further components besides the at least one optical window 130. At least one light beam 132 for interaction with the atom cloud is able to be radiated into the interior 120 through the optical window 130. The optical window 130 comprises at least one transparent substrate 134 and at least one transparent electrically conductive coating 136 of the substrate 134. The electrically conductive coating 136 can extend in particular areally over a surface of the substrate 134 facing the interior 120. In other words, the electrically conductive coating 136 can be applied at least to a side of the substrate 134 facing the interior 120. The electrically conductive coating 136 can comprise at least one transparent conductive oxide (TCO), in particular at least one transparent conductive oxide selected from the group consisting of tin oxide and indium tin oxide (ITO). The substrate 134 can comprise at least one material selected from the group consisting of quartz glass and borosilicate glass. The at least one optical window 130 can have a transparency of at least 10%, in particular at least 80% and in particular at least 85% in a wavelength range of 400 nm to 900 nm, in particular in a wavelength range of 300 nm to 1000 nm. The optical window 130 can furthermore have at least one antireflection coating. The antireflection coating can be applied on the side facing away from the interior and/or between the conductive coating and the substrate.

The at least one electrode 118 with the at least one optical window 130 can be at least partly embodied as a metallic plate 138 having at least one opening 140, in particular as a high-grade steel plate 141. The optical window 130 can at least partly cover the opening 140. The housing 116 can furthermore have at least one opening 142 through which the light beam 132 is able to be radiated into the interior 120. The optical window 130 can be mechanically connected to the housing 116 in such a way that the light beam 132 is able to be radiated into the interior 120 through the optical window 130 and through the opening 142. The opening 142 can penetrate through at least one wall of the housing 116 and taper conically in the direction of the interior 120. The electrodes 118 can have at least two optical windows 130, in particular at least three optical windows 130. The optical windows 130 can be arranged in such a way that a plurality of light beams 132 are able to be radiated from different directions through the optical windows 130 into the interior 120.

The at least one electrode 118 with the at least one optical window 130 can furthermore comprise at least one holding unit 144. The holding unit 144 can be configured to hold the optical window 130, in particular outside the interior 120 in front of the opening 142. The holding unit 144 can furthermore be configured to contact the transparent electrically conductive coating 136. For this purpose, the holding unit 144 can comprise at least one electrically conductive element, in particular a metal. The holding unit 144 can comprise a clamping mount 146. The holding unit 144 can be configured to hold the optical window 130 in the clamping mount 146. The clamping mount 146 can have at least one electrically conductive element, in particular a metal, which is pressed onto the transparent electrically conductive coating 136. In particular, at least one edge of the optical window 130 can be clamped in the clamping mount 146, such that the light beam 132 can be radiated into the interior 120 through a central portion of the optical window 130. The holding unit 144 can be an integral part of the housing 116. Alternatively or additionally, the holding unit 144 can be connected to the housing 116 via at least one connection element 148, in particular via at least one connection pin 150, for example by means of mechanical springs.

The cell 110, in addition to the at least one optical window 130, can furthermore have at least one nontransparent electrode 152. The at least one nontransparent electrode 152 can be produced from at least one electrically conductive material and can be at least partly integrated into the housing 116. The nontransparent electrode 152 can be at least partly integrated into a wall of the housing 116. The nontransparent electrode 152 can be at least partly produced from high-grade steel, in particular as a high-grade steel plate 141. As already indicated, the nontransparent electrode 152 can comprise at least one metallic segment 128 of the housing 116.

The cell 110 can furthermore comprise at least one vacuum cell 154. The housing 116 and the electrodes 118 can be introduced into the vacuum cell 154. In other words, the vacuum cell 154 can enclose the housing 116 and the electrodes 118, as illustrated in FIG. 2, for example. The optical window 130 can be at least partly fixed between the housing 116 and at least one inner wall 156 of the vacuum cell. The optical window 130 can be at least partly accommodated in at least one mount 158. The mount 158 can be pressed against the inner wall 156 of the vacuum cell 154 by at least one spring element 160 mounted on the housing 116, for example a compression spring. The spring element 160 can be configured to contact the transparent electrically conductive coating 136. The mount 158 can comprise the holding unit 144 or at least parts of the holding unit 144, in particular the clamping mount 146. The vacuum cell 154 can be at least partly embodied as a transparent vacuum cell 154, in particular as a glass cell 162. The cell 110 can furthermore comprise at least one rod mechanism 164 for holding the housing 116 and the electrodes 118, in particular in the vacuum cell 154. The rod mechanism 164 can consist of at least one metal. The cell 110 can comprise electrode leads 166 for electrically contacting the electrodes 118. The electrode leads 166 can be at least partly integrated into the rod mechanism 164.

Figure 4:
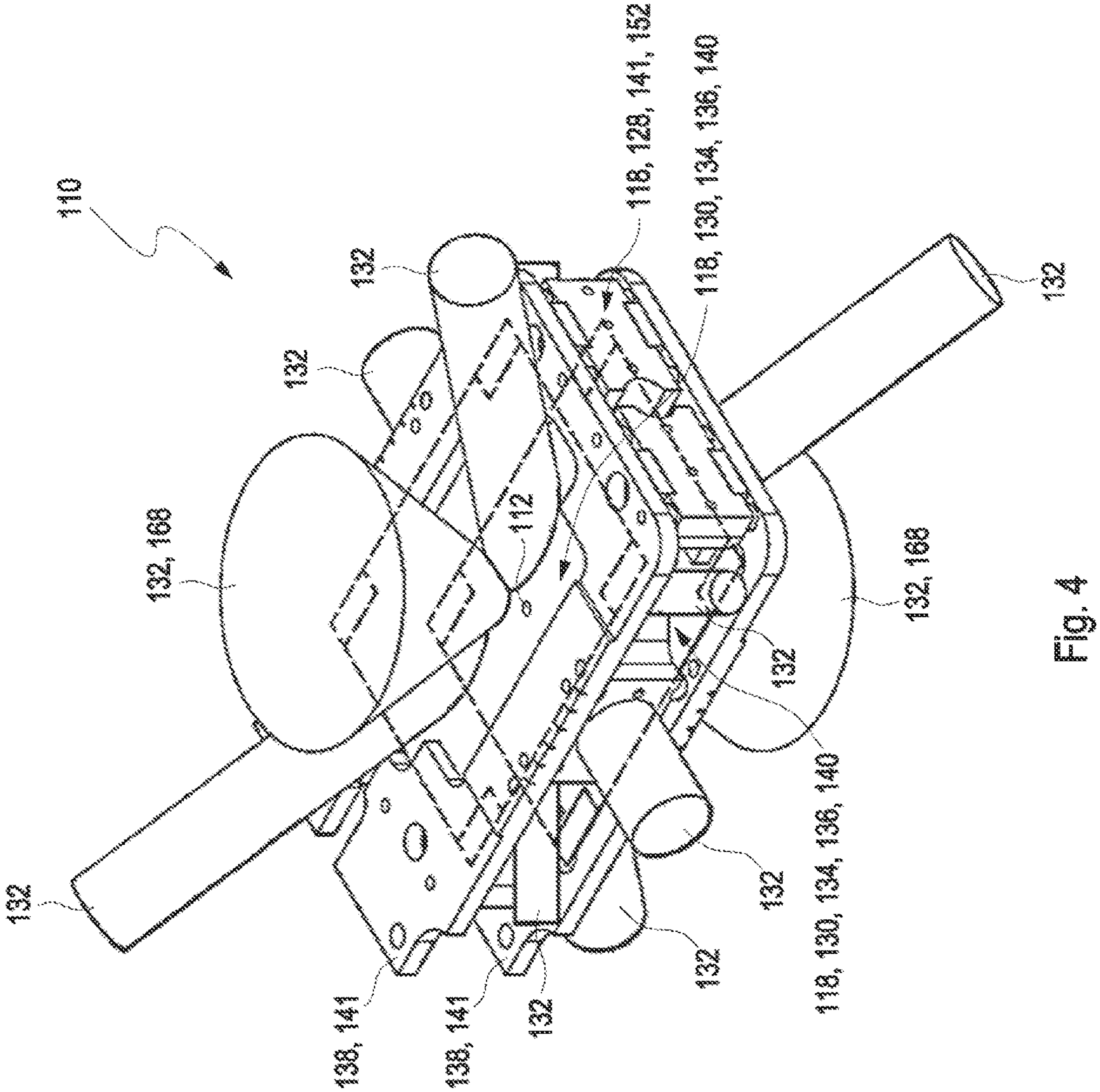
FIG. 4 shows a perspective illustration of a further exemplary embodiment of a cell according to the invention for carrying out quantum optical measurements on at least one atom cloud.

FIG. 4 shows a perspective illustration of a further exemplary embodiment of the cell 110 according to the invention for carrying out quantum optical measurements on at least one atom cloud. For the description of FIG. 4, recourse can be had extensively to the description of FIGS. 1 to 3.

In the case of the exemplary embodiment of the cell 110 as shown in FIG. 4, two in comparison large optical windows 130 are provided on the top side and the underside of the cell 110, through which a plurality of light beams 132 can be incident in the interior 120. Even light beams 168 with a high numerical aperture can be radiated in through these optical windows 130. In FIG. 4, the atom cloud is situated centrally in the interior 120 of the cell 110, this once again being indicated by the reference sign 112.

Figure 5:
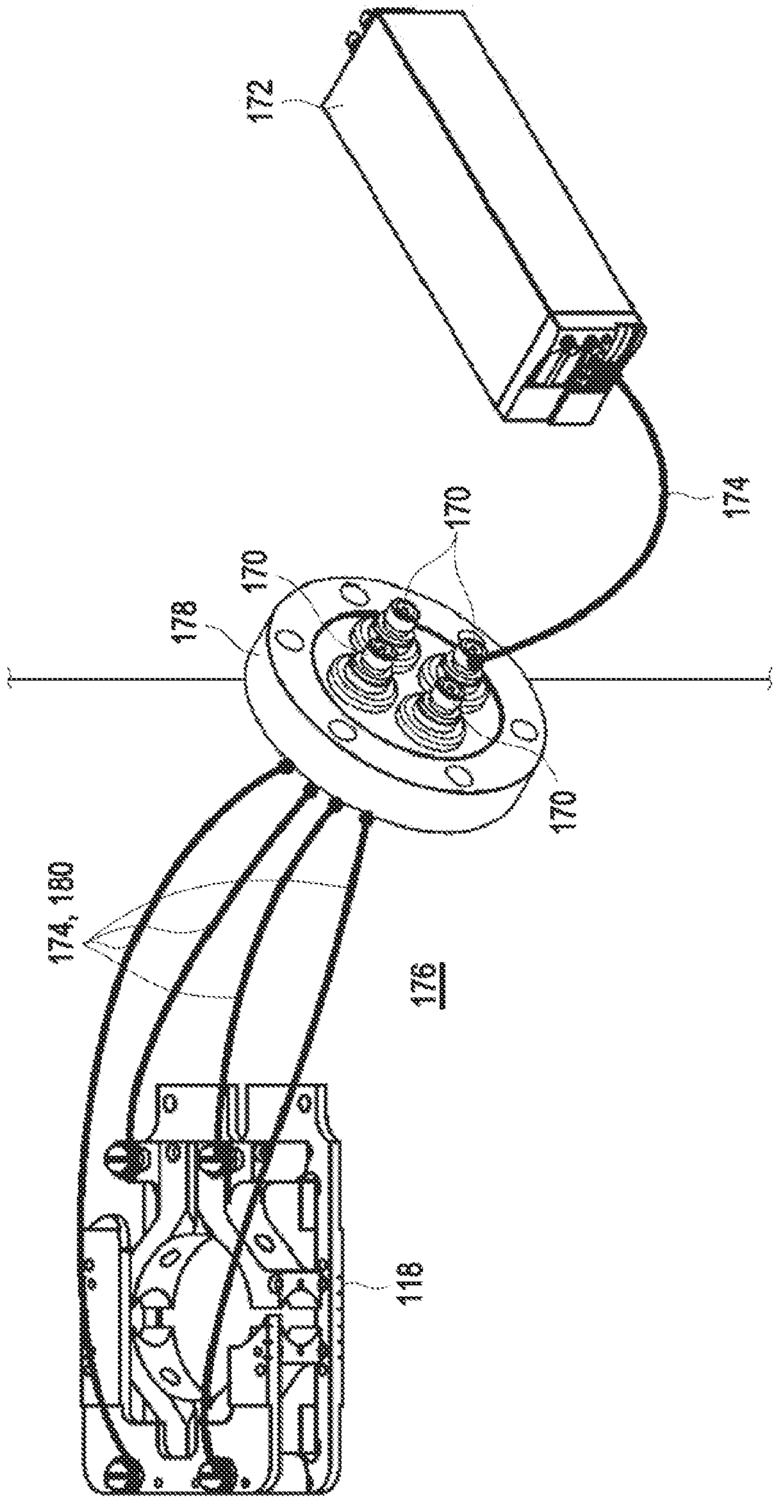
FIG. 5 shows one exemplary embodiment of a facility for contacting electrodes of the exemplary embodiment of the cell according to the invention in accordance with FIG. 4.

FIG. 5 shows one exemplary embodiment of a facility for contacting electrodes 118 of the exemplary embodiment of the cell 110 according to the invention in accordance with FIG. 4, which however is also analogously applicable to the exemplary embodiment in FIGS. 1-3. The cell 110 can generally comprise at least two electrical terminals 170 for connection to at least one voltage source 172. The electrical terminals 170 can be electrically connected to the electrodes 118, for example via cable connections 174. As already indicated, the cell 110 can have a high-vacuum region 176. The housing 116 and the electrodes 118 can be arranged in the high-vacuum region 176. The electrical terminals 170 can be arranged outside the high-vacuum region 176, for example on a high-vacuum bushing 178. Cable connections 180 compatible with high vacuum can be used in the high-vacuum region, which connections can be provided with Kapton insulations, for example. The cable connections 180 can be led or integrated for example wholly or partly in a connection piece, such as the connection piece 124 shown above, for example, and/or in a carrier construction, such as the carrier construction 126 shown above, for example.

Figure 6:
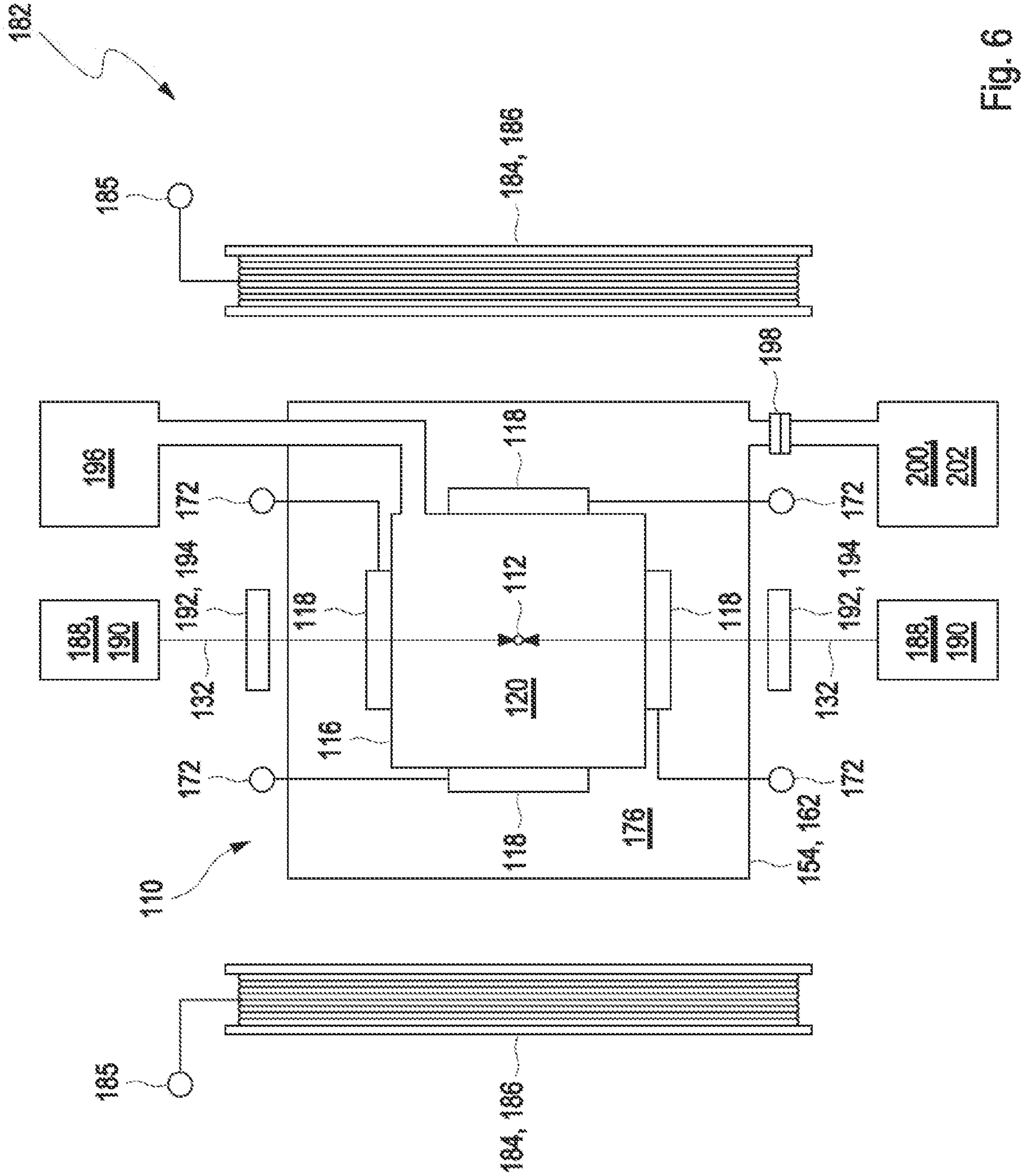
FIG. 6 shows a schematic illustration of one exemplary embodiment of a system according to the invention for carrying out quantum optical measurements on at least one atom cloud.

FIG. 6 shows a schematic illustration of one exemplary embodiment of a system 182 according to the invention for carrying out quantum optical measurements on at least one atom cloud. The system 182 comprises at least one cell 110 according to any of the preceding or below-described embodiments. The system 182 furthermore comprises at least one adjustable voltage source 172. The voltage source 172 is connected to the electrodes 118. The at least one electric field in the interior 120 of the housing 116 is adjustable, in particular controllable, by means of the voltage source 172. The system 182 can furthermore comprise at least one electrical coil 184 for generating at least one magnetic field in the interior 120. The electrical coil 184 can be connected to at least one current source 185. In particular, the electrical coil 184 can comprise a Helmholtz coil 186. In this regard, a pair of Helmholtz coils 186 arranged around the cell 110 can be used, for example.

The system 182 can furthermore comprise at least one light source 188 for generating the at least one light beam 132, in particular at least one laser source 190. The light source 188 can be arranged in such a way that the light beam 132 is able to be radiated into the interior 120 through the at least one optical window 130 for interaction with the atom cloud. The light beam 132 can function in particular as optical tweezers and/or as a gate laser.

The system 182 can furthermore comprise at least one optical system 192. The optical system 192 can be configured to radiate the light beam 132 with a numerical aperture of at least 0.1 through the optical window 130 into the interior 120. The optical system 192 can comprise in particular at least one microscope objective 194. The system 182 can furthermore comprise at least one atom source 196 connected to the cell 110. The atom source 196 can be configured to introduce atoms, molecules or ions of the atom cloud into the interior 120. In particular, the atom source 196 can be configured as heatable, e.g. in an effusion cell. As shown in FIG. 6, the vacuum cell 154 can have at least one flange 198 for connection to a high-vacuum device 200, in particular a high-vacuum device 200 with at least one vacuum pump 202, for example a turbo pump, an ion pump, a titanium sublimation pump and/or a non-evaporable getter (NEG) pump.

Figure 7:
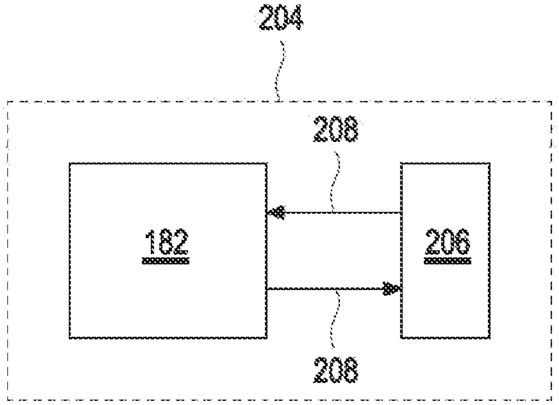
FIG. 7 shows a schematic illustration of one exemplary embodiment of a quantum computer according to the invention.

FIG. 7 shows a schematic illustration of one exemplary embodiment of a quantum computer 204 according to the invention. The quantum computer 204 comprises at least one system 182 according to any of the embodiments relating to a system 182 as described above or below. The quantum computer 204 furthermore comprises at least one controller unit 206 for addressing and/or reading out quantum bits in an atom cloud in the interior 120. The quantum computer 204 can furthermore comprise at least one interface 208 configured to enable communication between controller unit 206 and system 182. In addition, the interface 208 can be configured to enable communication with external apparatuses.

Figure 8:
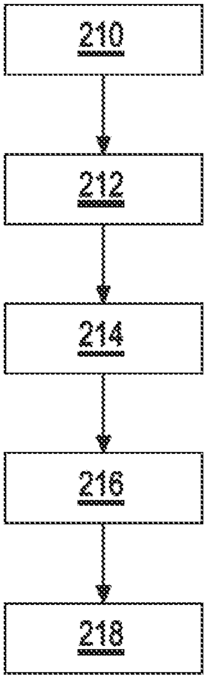
FIG. 8 shows a flow diagram of one exemplary embodiment of a method according to the invention for carrying out quantum optical measurements on at least one atom cloud.

FIG. 8 shows a flow diagram of one exemplary embodiment of a method according to the invention for carrying out quantum optical measurements on at least one atom cloud. The method comprises the following steps:

i. (identified by reference 210) providing at least one system 182 according to any of the embodiments relating to a system as described above or below;
ii. (identified by reference sign 212) generating at least one high vacuum, in particular an ultrahigh vacuum, at the location of the cell 110 of the system 182, in particular in the interior 120;
iii. (identified by reference sign 214) introducing at least one atom cloud into the interior 120 of the cell 110;
iv. (identified by reference sign 216) radiating at least one light beam 132 through the at least one optical window 130 of the cell 110, such that the light beam 132 interacts with the atom cloud in the interior 120 of the cell 110; and
v. (identified by reference sign 218) subjecting the electrodes 118 of the cell 110 to electrical potentials and adjusting an electric field in the interior 120 by means of the electrodes 118.

In this case, the method steps can be carried out in the indicated order or in a different order, wherein one or more of the method steps can at least partly also be carried out simultaneously and wherein one or more of the method steps can be repeated a number of times. Moreover, further method steps, independently of whether or not they are mentioned here, can be implemented in addition.

LIST OF REFERENCE SIGNS

110 cell
112 location of the atom cloud
114 control unit
116 housing
118 electrode
120 interior
122 opening of the housing for introducing the atoms
124 connection piece
125 tunnel
126 carrier construction
128 metallic segment
130 optical window
132 light beam
134 substrate
136 electrically conductive coating
138 metallic plate
140 opening of the metallic plate
141 high-grade steel plate
142 opening of the housing for radiating in the light beam

144 holding unit
146 clamping mount
148 connection element
150 connection pin
152 nontransparent electrode
154 vacuum cell
156 inner wall of the vacuum cell
158 mount
160 spring element
162 glass cell
164 rod mechanism
166 electrode leads
168 light beam with high numerical aperture
170 electrical terminal
172 voltage source
174 cable connection
176 high-vacuum region
178 high-vacuum bushing
180 cable connection compatible with high vacuum
182 system
184 electrical coil
185 current source
186 Helmholtz coil
188 light source
190 laser source
192 optical system
194 microscope objective
196 atom source
198 flange
200 high-vacuum device
202 vacuum pump
204 quantum computer
206 controller unit
208 interface
210 method step i.
212 method step ii.
214 method step iii.
216 method step iv.
218 method step v.

The invention claimed is:

1. A cell for carrying out quantum optical measurements on at least one atom cloud, comprising a control unit for controlling electric fields at the location of the atom cloud, wherein the control unit comprises:

at least one housing having at least one interior for receiving the atom cloud and having at least one opening for introducing the atoms of the atom cloud into the interior; and at least two electrodes, wherein the at least two electrodes include no more than six individually controllable electrodes, wherein the electrodes, independently of one another, are able to be subjected to electrical potentials and are configured to influence at least one electric field in the interior, wherein the electrodes are mechanically connected to the housing, wherein at least one of the electrodes is at least partly formed by at least one optical window through which at least one light beam for interaction with the atom cloud is able to be radiated into the interior, wherein the optical window comprises at least one transparent substrate and at least one transparent electrically conductive coating of the substrate, wherein the no more than six electrodes include no more than four transparent electrodes and no more than two non-transparent electrodes, wherein the at least one housing and the at least two electrodes at least partially form a Faraday cage, wherein the Faraday cage at least partially shields the atom cloud against electric fields in all three spatial directions, and wherein the Faraday cage at least partially influences the at least one electric field in the interior in all three spatial directions when the at least two electrodes are subjected to corresponding electrical potentials.

2. The cell as claimed in claim 1, wherein the at least one electrode having the at least one optical window comprises at least one holding unit, wherein the holding unit is configured to hold the optical window, wherein the holding unit is furthermore configured to electrically contact the transparent electrically conductive coating.

3. The cell as claimed in claim 2, wherein the holding unit is configured to hold the optical window in a clamping mount, wherein the clamping mount has at least one electrically conductive element which is pressed onto the transparent electrically conductive coating.

4. The cell as claimed in claim 1, furthermore comprising at least two electrical terminals for connection to at least one voltage source, wherein the electrical terminals are electrically connected to the electrodes.

5. The cell as claimed in claim 1, wherein the electrically conductive coating comprises at least one transparent conductive oxide (TCO).

6. The cell as claimed in claim 1, wherein the substrate comprises at least one material selected from the group consisting of quartz glass and borosilicate glass.

7. A cell for carrying out quantum optical measurements on at least one atom cloud, comprising a control unit for controlling electric fields at the location of the atom cloud, wherein the control unit comprises:

at least one housing having at least one interior for receiving the atom cloud and having at least one opening for introducing the atoms of the atom cloud into the interior; and at least two electrodes, wherein the electrodes, independently of one another, are able to be subjected to electrical potentials and are configured to influence at least one electric field in the interior, wherein the electrodes are mechanically connected to the housing, wherein at least one of the electrodes is at least partly formed by at least one optical window through which at least one light beam for interaction with the atom cloud is able to be radiated into the interior, wherein the optical window comprises at least one transparent substrate and at least one transparent electrically conductive coating of the substrate, wherein the at least one housing and the at least two electrodes at least partially form a Faraday cage, wherein the Faraday cage at least partially shields the atom cloud against electric fields in all three spatial directions, wherein the Faraday cage at least partially influences the at least one electric field in the interior in all three spatial directions when the at least two electrodes are subjected to corresponding electrical potentials, wherein the electrodes have a first optical window to radiate light therethrough into the interior and a second optical window arranged perpendicular to the first optical window to radiate light therethrough in a second direction perpendicular to the first direction into the interior.

8. The cell as claimed in claim 1, wherein the housing is at least partly produced from at least one electrically conductive material.

9. The cell as claimed in claim 1, wherein at least one non-transparent electrode is produced from at least one electrically conductive material and is at least partly integrated into the housing.

10. The cell as claimed in claim 1, furthermore comprising at least one vacuum cell, wherein the housing and the electrodes are introduced into the vacuum cell, wherein the vacuum cell has at least one flange for connection to a high-vacuum device.

11. The cell as claimed in claim 10, wherein the optical window is at least partly fixed between the housing and at least one inner wall of the vacuum cell, wherein the optical window is at least partly accommodated in at least one mount, wherein the mount is pressed against the inner wall of the vacuum cell by at least one spring element mounted on the housing.

12. The cell as claimed in claim 10, wherein the vacuum cell is at least partly embodied as a transparent vacuum cell.

13. A system for carrying out quantum optical measurements on at least one atom cloud, comprising at least one cell as claimed in claim 1, furthermore comprising at least one adjustable voltage source, wherein the voltage source is connected to the electrodes and wherein the at least one electric field in the interior of the housing is adjustable by means of the voltage source.

14. A quantum computer, comprising at least one system as claimed in claim 13, furthermore comprising at least one controller unit for addressing and/or reading out quantum bits in an atom cloud in the interior.

15. A method for carrying out quantum optical measurements on at least one atom cloud, comprising the following steps:

i. providing at least one system as claimed in claim 13 relating to a system;

ii. generating at least one high vacuum at the location of the cell of the system;

iii. introducing at least one atom cloud into the interior of the cell;

iv. radiating at least one light beam through the at least one optical window of the cell, such that the light beam interacts with the atom cloud in the interior of the cell; and v. subjecting the electrodes of the cell to electrical potentials and adjusting an electric field in the interior by means of the electrodes.

16. The cell as claimed in claim 1, wherein at least two of the no more than six electrodes are arranged on mutually opposite sides of the at least one housing in relation to the at least one interior.

17. The cell as claimed in claim 1, wherein the no more than six electrodes comprise three pairs of electrodes, and wherein each pair of electrodes are arranged on mutually opposite sides of the one housing in relation to the at least one interior.

18. A cell for carrying out quantum optical measurements on at least one atom cloud, comprising a control unit for controlling electric fields at the location of the atom cloud, wherein the control unit comprises:

at least one housing having at least one interior for receiving the atom cloud and having at least one opening for introducing the atoms of the atom cloud into the interior; and at least one and no more than six individually controllable electrodes, wherein the at least one and no more than six electrodes, independently of one another, are able to be subjected to electrical potentials and are configured to influence at least one electric field in the interior, wherein the at least one and no more than six electrodes are mechanically connected to the housing, wherein the no more than six electrodes comprise at least one and no more than four transparent electrodes and no more than two non-transparent electrodes, wherein at least one of the no more than four transparent electrodes is at least partly formed by at least one optical window through which at least one light beam for interaction with the atom cloud is able to be radiated into the interior, wherein the optical window comprises at least one transparent substrate and at least one transparent electrically conductive coating of the substrate, wherein the at least one housing and the no more than six electrodes at least partially form a Faraday cage, and wherein the Faraday cage at least partially influences the at least one electric field in the interior in all three spatial directions when the no more than six electrodes are subjected to corresponding electrical potentials.

19. The cell as claimed in claim 18, wherein the at least one housing and the no more than six electrodes at least partially form a Faraday cage, and wherein the Faraday cage at least partially shields the atom cloud against electric fields in all three spatial directions.

20. The cell as claimed in claim 18, wherein the no more than six electrodes comprise at least one and no more than three pairs of electrodes, and wherein each pair of electrodes are arranged on mutually opposite sides of the at least one housing in relation to the at least one interior.

* * * * *